(12) United States Patent
Jaeger et al.

(10) Patent No.: US 11,797,885 B2
(45) Date of Patent: Oct. 24, 2023

(54) OPTIMIZATIONS FOR MACHINE LEARNING DATA PROCESSING PIPELINE

(71) Applicant: SAP SE, Walldorf (DE)

(72) Inventors: Steven Jaeger, Heidelberg (DE); Isil Pekel, Mannheim (DE); Manuel Zeise, Karlsruhe (DE)

(73) Assignee: SAP SE, Walldorf (DE)

( * ) Notice: Subject to any disclaimer, the term of this patent is extended or adjusted under 35 U.S.C. 154(b) by 255 days.

(21) Appl. No.: 17/031,665

(22) Filed: Sep. 24, 2020

(65) Prior Publication Data

US 2022/0092471 A1    Mar. 24, 2022

(51) Int. Cl.
*G06N 20/00* (2019.01)

(52) U.S. Cl.
CPC ..................... *G06N 20/00* (2019.01)

(58) Field of Classification Search
CPC .......... G06N 20/00; G16H 40/20; G06F 8/31; G06F 18/2148; G06F 11/3684; C09K 11/70

See application file for complete search history.

(56) References Cited

U.S. PATENT DOCUMENTS

| | | | | |
|---|---|---|---|---|
| 11,348,032 | B1 * | 5/2022 | Van Gael | G06F 8/31 |
| 2015/0379430 | A1 * | 12/2015 | Dirac | G06N 20/00 706/12 |
| 2017/0220949 | A1 * | 8/2017 | Feng | H04L 41/16 |
| 2018/0203690 | A1 * | 7/2018 | Nair | G06F 11/3684 |
| 2018/0342324 | A1 * | 11/2018 | Cha | C09K 11/70 |
| 2019/0042887 | A1 * | 2/2019 | Nguyen | G06F 18/2148 |
| 2020/0111030 | A1 | 4/2020 | Starosta et al. | |

OTHER PUBLICATIONS

Sparks, E.R. et al., "Automating Model Search for Large Scale Machine Learning," User Interface Software and Technology, ACM, Aug. 27, 2015, pp. 368-380.

Takahashi, Y. et al., "A Framework for Model Search Across Multiple Machine Learning Implementations," 2019 15th International Conference on eScience (eScience), IEEE, (2019), pp. 331-338.

Extended European Search Report issued in European Application No. 21184568.0-1208, dated Feb. 8, 2022, 8 pages.

* cited by examiner

*Primary Examiner* — Saba Dagnew
(74) *Attorney, Agent, or Firm* — Mintz Levin Cohn Ferris Glovsky and Popeo, P.C.

(57) ABSTRACT

A data processing pipeline may be generated to include an orchestrator node, a preparator node, and an executor node. The preparator node may generate a training dataset. The executor node may execute machine learning trials by applying, to the training dataset, a machine learning model and/or a different set of trial parameters. The orchestrator node may identify, based on a result of the machine learning trials, a machine learning model for performing a task. The execution of the data processing pipeline may be optimized. Examples of optimizations include pooling multiple machine learning trials for execution at a single executor node, executing at least some machine learning trials using a sub-sample of the training dataset, and adjusting a proportion of trial parameters sampled from a uniform distribution to avoid a premature convergence to a local minima within the hyper-parameter space for generating the machine learning model.

20 Claims, 18 Drawing Sheets

OPTIMIZATIONS FOR MACHINE LEARNING DATA PROCESSING PIPELINE

TECHNICAL FIELD

The subject matter described herein relates generally to machine learning and more specifically to optimizations for a data processing pipeline implementing a machine learning model.

BACKGROUND

Machine learning models may be trained to perform a variety of cognitive tasks including, for example, object identification, natural language processing, information retrieval, speech recognition, classification, regression, and/or the like. For example, an enterprise resource planning (ERP) system may include an issue tracking system configured to generate a ticket in response to an error reported via one or more telephone calls, emails, short messaging service (SMS) messages, social media posts, web chats, and/or the like. The issue tracking system may generate the ticket to include a textual description of the error associated with the ticket. As such, in order to determine a suitable response for addressing the error associated with the ticket, the enterprise resource planning system may include a machine learning model trained to perform text classification. For instance, the machine learning model may be trained to determine, based at least on the textual description of the error, a priority for the ticket corresponding to a severity of the error.

SUMMARY

Systems, methods, and articles of manufacture, including computer program products, are provided for optimizing a data processing pipeline implementing a machine learning model. In one aspect, there is provided a system including at least one data processor and at least one memory. The at least one memory may store instructions that cause operations when executed by the at least one data processor. The operations may include: generating, based at least on one or more inputs received from a client device, a data processing pipeline configured to generate a machine learning model having a set of parameters for performing a task associated with an input dataset, the data processing pipeline including an orchestrator node, a preparator node, and a plurality of executor nodes, the preparator node configured to generate, based at least on the input dataset, a training dataset, the plurality of executor nodes configured to execute a plurality of machine learning trials, each of the plurality of machine learning trials being executed by at least applying, to the training dataset, a different type of machine learning model and/or a different sets of trial parameters, and the orchestrator node configured to identify, based at least on a result of the plurality of machine learning trials, the machine learning model having the set of parameters for performing the task; identifying one or more pools of machine learning trials, each pool of machine learning trials being assigned for execution at a single one of the plurality of executor nodes; and executing the data processing pipeline to generate the machine learning model for performing the task, the executing of the data processing pipeline includes executing the one or more pools of machine learning trials.

In some variations, one or more features disclosed herein including the following features can optionally be included in any feasible combination. A runtime for executing the plurality of machine learning trials may be determined. The runtime may include a non-computation time and a computation time. The one or more pools of machine learning trials may be generated based at least on a ratio of computation time to non-computation time. Each pool of machine learning trials may be generated to have an above threshold ratio of computation time to non-computation time without including an above threshold quantity of machine learning trials.

In some variations, a portion of the plurality of machine learning trials may be executed using a sub-sample of the training dataset.

In some variations, a sub-sampling ratio corresponding to a portion of the training dataset used for executing the portion of the plurality of machine learning trials may be determined based at least on an available time budget.

In some variations, the sub-sampling ratio may be determined by at least determining a first runtime associated with a first portion of the training dataset and a second runtime associated with a second portion of the training dataset. The second portion of the training dataset being a first bisection of the first portion of the training dataset. The sub-sampling ratio may be determined to be a third portion of the training dataset corresponding to a second bisection between the first portion and the second portion in response to the first runtime exceeding a threshold portion of the available time budget and the second runtime not exceeding the threshold portion of the available time budget.

In some variations, a switch point at which a full training dataset is used for executing a remaining portion of the plurality of machine learning trials may be determined.

In some variations, the switch point may be determined based at least on an available time budget and a runtime associated with using the full training dataset to execute a machine learning trial. The switch point may be determined to accommodate, within the available time budget, at least a single machine learning trial executed using the full training dataset.

In some variations, a proportion of trial parameters sampled from a uniform distribution may be adjusted to avoid a convergence to a local minima within a hyper-parameter space for generating the machine learning model.

In some variations, in response to a quantity of machine learning trials executed without an improvement in performance being below a first threshold, a trial parameter set for one or more subsequent machine learning trials may be generated to include a first proportion of trial parameters sampled from the uniform distribution. In response to the quantity of machine learning trials executed without the improvement in performance being between the first threshold and a second threshold, the trial parameter set for one or more subsequent machine learning trials may be generated to include a second proportion of trial parameters sampled from the uniform distribution. The second proportion may be a linear function of the quantity of machine learning trials executed without the improvement in performance. In response to the quantity of machine learning trials executed without the improvement in performance exceeding the second threshold, the trial parameter set for one or more subsequent machine learning trials may be generated to include a third proportion of trial parameters sampled from the uniform distribution.

In some variations, the machine learning model may be a neural network, a regression model, an instance-based model, a regularization model, a decision tree, a random forest, a Bayesian model, a clustering model, an associative model, a dimensionality reduction model, and/or an ensemble model.

In another aspect, there is provided a method for optimizing a data processing pipeline implementing a machine learning model. The method may include: generating, based at least on one or more inputs received from a client device, a data processing pipeline configured to generate a machine learning model having a set of parameters for performing a task associated with an input dataset, the data processing pipeline including an orchestrator node, a preparator node, and a plurality of executor nodes, the preparator node configured to generate, based at least on the input dataset, a training dataset, the plurality of executor nodes configured to execute a plurality of machine learning trials, each of the plurality of machine learning trials being executed by at least applying, to the training dataset, a different type of machine learning model and/or a different sets of trial parameters, and the orchestrator node configured to identify, based at least on a result of the plurality of machine learning trials, the machine learning model having the set of parameters for performing the task; identifying one or more pools of machine learning trials, each pool of machine learning trials being assigned for execution at a single one of the plurality of executor nodes; and executing the data processing pipeline to generate the machine learning model for performing the task, the executing of the data processing pipeline includes executing the one or more pools of machine learning trials.

In some variations, one or more features disclosed herein including the following features can optionally be included in any feasible combination. The method may further include: determining a runtime for executing the plurality of machine learning trials, the runtime including a non-computation time and a computation time; and generating, based at least on a ratio of computation time to non-computation time, the one or more pools of machine learning trials, each pool of machine learning trials being generated to have an above threshold ratio of computation time to non-computation time without including an above threshold quantity of machine learning trials.

In some variations, the method may further include executing a portion of the plurality of machine learning trials using a sub-sample of the training dataset.

In some variations, the method may further include determining, based at least on an available time budget, a sub-sampling ratio corresponding to a portion of the training dataset used for executing the portion of the plurality of machine learning trials.

In some variations, the sub-sampling ratio may be determined by at least determining a first runtime associated with a first portion of the training dataset and a second runtime associated with a second portion of the training dataset. The second portion of the training dataset may be a first bisection of the first portion of the training dataset. The sub-sampling ratio may be determined to be a third portion of the training dataset corresponding to a second bisection between the first portion and the second portion in response to the first runtime exceeding a threshold portion of the available time budget and the second runtime not exceeding the threshold portion of the available time budget.

In some variations, the method may further include determining a switch point at which a full training dataset is used for executing a remaining portion of the plurality of machine learning trials.

In some variations, the switch point may be determined based at least on an available time budget and a runtime associated with using the full training dataset to execute a machine learning trial. The switch point may be determined to accommodate, within the available time budget, at least a single machine learning trial executed using the full training dataset.

In some variations, the method may further include adjusting a proportion of trial parameters sampled from a uniform distribution to avoid a convergence to a local minima within a hyper-parameter space for generating the machine learning model.

In some variations, the method may further include: in response to a quantity of machine learning trials executed without an improvement in performance being below a first threshold, generate a trial parameter set for one or more subsequent machine learning trials to include a first proportion of trial parameters sampled from the uniform distribution; in response to the quantity of machine learning trials executed without the improvement in performance being between the first threshold and a second threshold, generate the trial parameter set for one or more subsequent machine learning trials to include a second proportion of trial parameters sampled from the uniform distribution, the second proportion being a linear function of the quantity of machine learning trials executed without the improvement in performance; and in response to the quantity of machine learning trials executed without the improvement in performance exceeding the second threshold, generate the trial parameter set for one or more subsequent machine learning trials to include a third proportion of trial parameters sampled from the uniform distribution.

In another aspect, there is provided a computer program product that includes a non-transitory computer readable storage medium. The non-transitory computer-readable storage medium may include program code that causes operations when executed by at least one data processor. The operations may include: generating, based at least on one or more inputs received from a client device, a data processing pipeline configured to generate a machine learning model having a set of parameters for performing a task associated with an input dataset, the data processing pipeline including an orchestrator node, a preparator node, and a plurality of executor nodes, the preparator node configured to generate, based at least on the input dataset, a training dataset, the plurality of executor nodes configured to execute a plurality of machine learning trials, each of the plurality of machine learning trials being executed by at least applying, to the training dataset, a different type of machine learning model and/or a different sets of trial parameters, and the orchestrator node configured to identify, based at least on a result of the plurality of machine learning trials, the machine learning model having the set of parameters for performing the task; identifying one or more pools of machine learning trials, each pool of machine learning trials being assigned for execution at a single one of the plurality of executor nodes; and executing the data processing pipeline to generate the machine learning model for performing the task, the executing of the data processing pipeline includes executing the one or more pools of machine learning trials.

Implementations of the current subject matter can include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to a machine learning data processing pipeline, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1A:
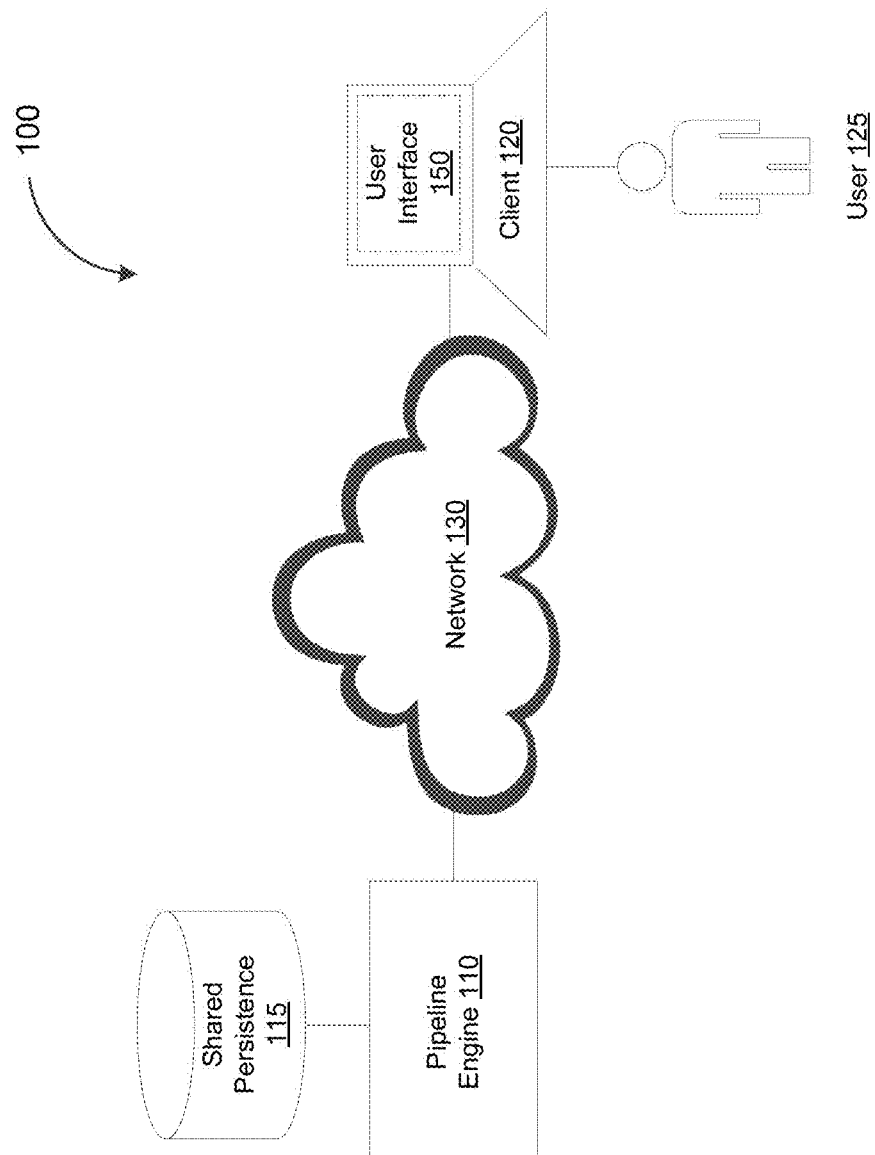
FIG. 1 depicts a system diagram illustrating a data processing pipeline generator system, in accordance with some example embodiments.

A data processing pipeline may include a series of operations for processing data including collecting and/or manipulating data, such as exceptionally voluminous and/or complex data sets known as "big data." The data processing pipeline may be represented graphically as a plurality of operator nodes interconnected by one or more directed edges of a directed graph. Each operator node may correspond to a data processing operation performed on data traversing through the operator node. Meanwhile, a directed edge interconnecting two operator nodes may indicate a flow of data between the data processing operations corresponding to each operator node. Accordingly, a graph, such as a directed graph, representative of the data processing pipeline may be constructed by at least interconnecting, with one or more directed edges, a series of operator nodes.

The graph representative of the data processing pipeline may be constructed to include one or more operator nodes configured to generate a machine learning model trained to perform a task. For example, the graph may be constructed to include an orchestrator node, one or more preparator nodes, and one or more executor nodes. The orchestrator node may be configured to coordinate the operations of preparator node and the one or more executor node. For instance, each preparator node may be configured to generate, based at least on an input dataset associated with the task, a training dataset and a validation dataset. Meanwhile, each executor node may be configured to apply, to the training dataset and the validation dataset generated by the preparator node, a different type of machine learning model and/or a different set of parameters. The orchestrator node may be configured to determine, based at least on the performance of the different type of machine learning models, a machine learning model including a set of model parameters and hyper-parameters for performing the task associated with the input dataset. Accordingly, the machine learning model trained to perform the task may be generated by at least executing the data processing pipeline including the orchestrator node, the one or more preparator nodes, and the one or more executor nodes.

In some example embodiments, the execution of the data processing pipeline to generate a machine learning model including a set of model parameters and hyper-parameters for performing the task may require one or more optimizations. For example, the execution of the data processing pipeline may be optimized through the pooling of machine learning trials to reduce the overhead associated with provisioning computing instances and reading the input dataset for each individual machine learning trial. The execution of the data processing pipeline may also be optimized, for example, through sub-sampling, to accommodate large training datasets. Although training a machine learning model with a large training dataset may improve the accuracy and robustness of the resulting machine learning model, but doing so may require computation time in excess of the available time budget. Alternatively and/or additionally, the execution of the data processing pipeline may be optimized to eliminate inconsistencies in the results of executing the same data processing pipeline multiple times. For instance, instead of converging to a local minima prematurely, optimizations may be applied to encourage the exploration of the full hyper-parameter space during the execution of the data processing pipeline.

FIG. 1 depicts a system diagram illustrating a data processing pipeline generator system 100, in accordance with some example embodiments. Referring to FIG. 1, the data processing pipeline generator system 100 may include a pipeline engine 110. As shown in FIG. 1, the pipeline engine 110 and the client 120 may be communicatively coupled via a network 130. The client 120 may be a processor-based device including, for example, a smartphone, a tablet computer, a wearable apparatus, a virtual assistant, an Internet-of-Things (IoT) appliance, and/or the like. Meanwhile, the network 130 may be any wired and/or wireless network including, for example, a public land mobile network (PLMN), a wide area network (WAN), a local area network (LAN), a virtual local area network (VLAN), the Internet, and/or the like.

The client 120 may interact with the pipeline engine 110 to generate one or more data processing pipelines. As shown in FIG. 1, the pipeline engine 110 may be associated with a user interface 150 configured to receive, from a user 125 at the client 120, one or more inputs for editing a graph representative of a data processing pipeline as well as output, to the user 125 at the client 120, a progress and/or a result of executing the data processing pipeline. In some example embodiments, the one or more inputs may edit the graph representative of the data processing pipeline to include one or more operator nodes configured to generate, based at least on an input dataset, a machine learning model trained to perform a task associated with the input dataset. For example, the graph representative of the data processing pipeline may be edited to include an orchestrator node, one or more preparator node, and one or more executor nodes.

In some example embodiments, the orchestrator node may be configured to coordinate the operations of the one or more executor node. Meanwhile, each executor node may be configured to apply, to a training dataset and a validation dataset generated by the one or more preparator nodes based on the input dataset, a different type of machine learning model and/or a different set of parameters. Furthermore, the orchestrator node may be configured to identify, based at least on the performance associated with the different types of machine learning models and/or different sets of parameters, a machine learning model for performing the task associated with the input dataset. Accordingly, the machine learning model trained to perform the task may be generated by at least executing the data processing pipeline including the orchestrator node, the one or more preparator nodes, and the one or more executor nodes. For example, the data processing pipeline may be executed to generate a machine learning model trained to perform a cognitive task such as object identification, natural language processing, information retrieval, speech recognition, classification, and/or regression. The machine learning model may be any type of machine learning model including, for example, a neural network, a regression model, an instance-based model, a regularization model, a decision tree, a random forest, a Bayesian model, a clustering model, an associative model, a dimensionality reduction model, an ensemble model, and/or the like.

Figure 2A:
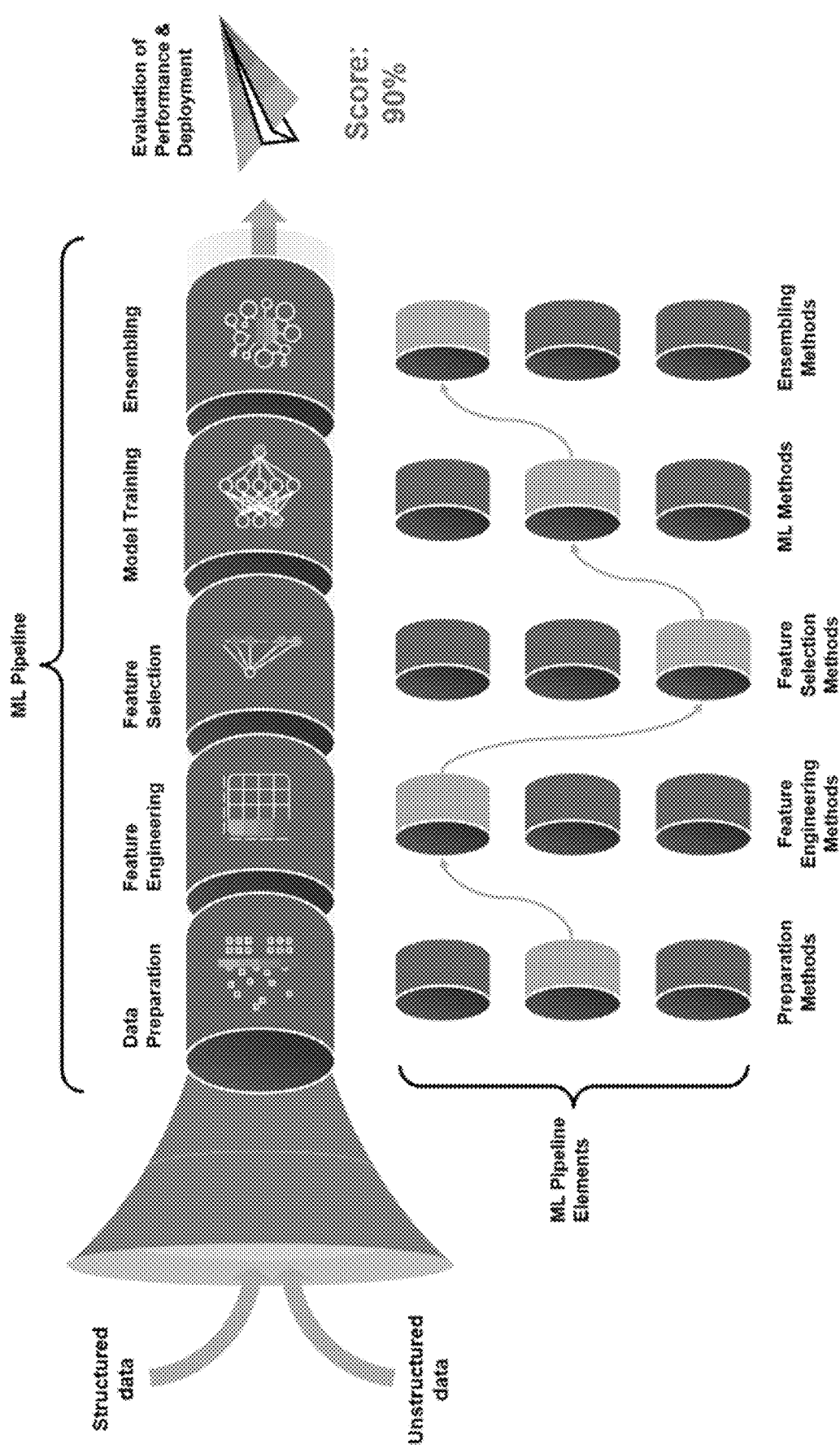
FIG. 2A depicts a schematic diagram illustrating an example of a data processing pipeline having modular pipeline elements, in accordance with some example embodiments.

To further illustrate, FIG. 2A depicts a schematic diagram illustrating an example of a data processing pipeline having modular pipeline elements, in accordance with some example embodiments. As shown in FIG. 2A, the data processing pipeline may include different combination of the elements for data preparation, feature engineering, feature selection, model training, ensembling, and/or the like. Each element of the data processing pipeline may be associated with one or more hyper-parameters. A machine learning model for performing the task associated with the input dataset may be identified by at least evaluating a performance of the data processing pipeline across different combinations of pipeline elements and hyper-parameters. For example, an executor node may be configured to execute one or more machine learning trials, each of which corresponding to a different combination of pipeline elements and hyper-parameters. Moreover, the orchestrator node may identify, based at least on the performance of the one or more machine learning trials, the machine learning model for performing the task associated with the input dataset. As used herein, the "optimal" machine learning model for performing the task may refer to a combination of a type of machine learning model and the corresponding parameters and hyper-parameters that yielded the best performance across the one or more machine learning trials.

Figure 2B:
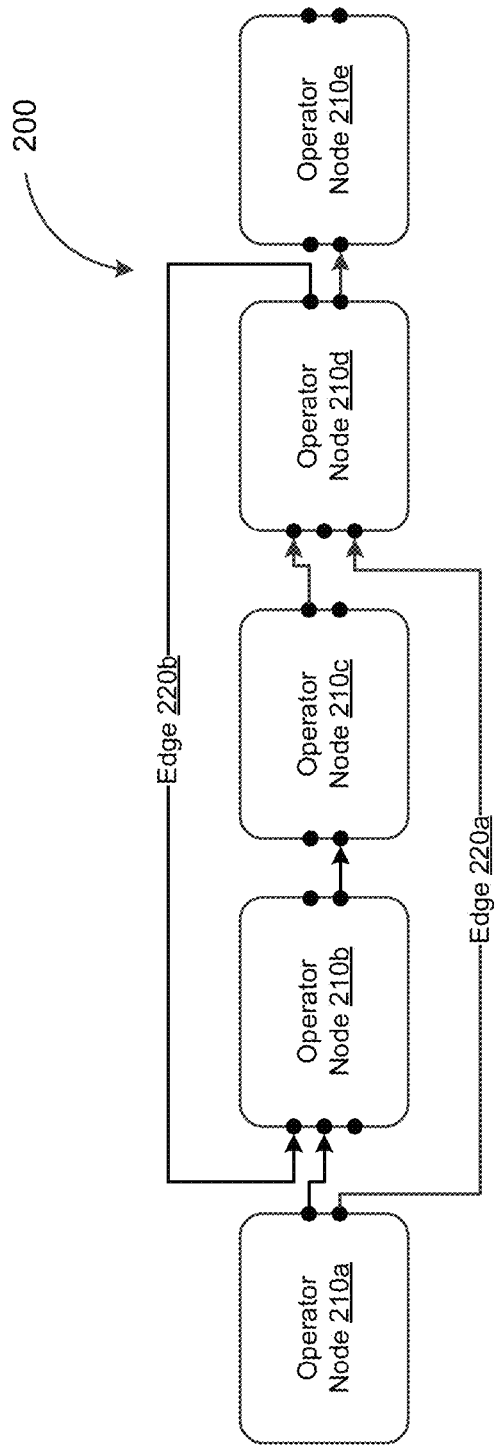
FIG. 2B depicts an example of a graph representative of a data processing pipeline, in accordance with some example embodiments.

FIG. 2B depicts an example of a graph representative of a data processing pipeline 200, in accordance with some example embodiments. Referring to FIG. 2B, the data processing pipeline 200 may include a plurality of operator nodes including, for example, a first operator node 210a, a second operator node 210b, a third operator node 210c, a fourth operator node 210d, a fifth operator node 210e, and/or the like. Each of the first operator node 210a, the second operator node 210b, the third operator node 210c, the fourth operator node 210d, and/or the fifth operator node 210e may correspond to a data processing operation performed on data traversing through the operator node.

Furthermore, FIG. 2B shows the first operator node 210a, the second operator node 210b, the third operator node 210c, the fourth operator node 210d, and/or the fifth operator node 210e as interconnected via one or more directed edges. A directed edge may indicate a flow of data between the data processing operations corresponding to operator nodes interconnected by the directed edge. For example, a first edge 220a may interconnect the first operator node 210a and the fourth operator node 210d to at least indicate that an output of the data processing operation corresponding to the first operator node 210*a* is provided as an input to the data processing operation corresponding to the fourth operator node 210*d*. Alternatively and/or additionally, a second edge 220*b* interconnected the second operator node 210*b* and the fourth operator node 210*d* may indicate that an output of the data processing operation corresponding to the fourth operator node 210*d* may be provided as an input to the data processing operation corresponding to the second operator node 210*b*.

Figure 2C:
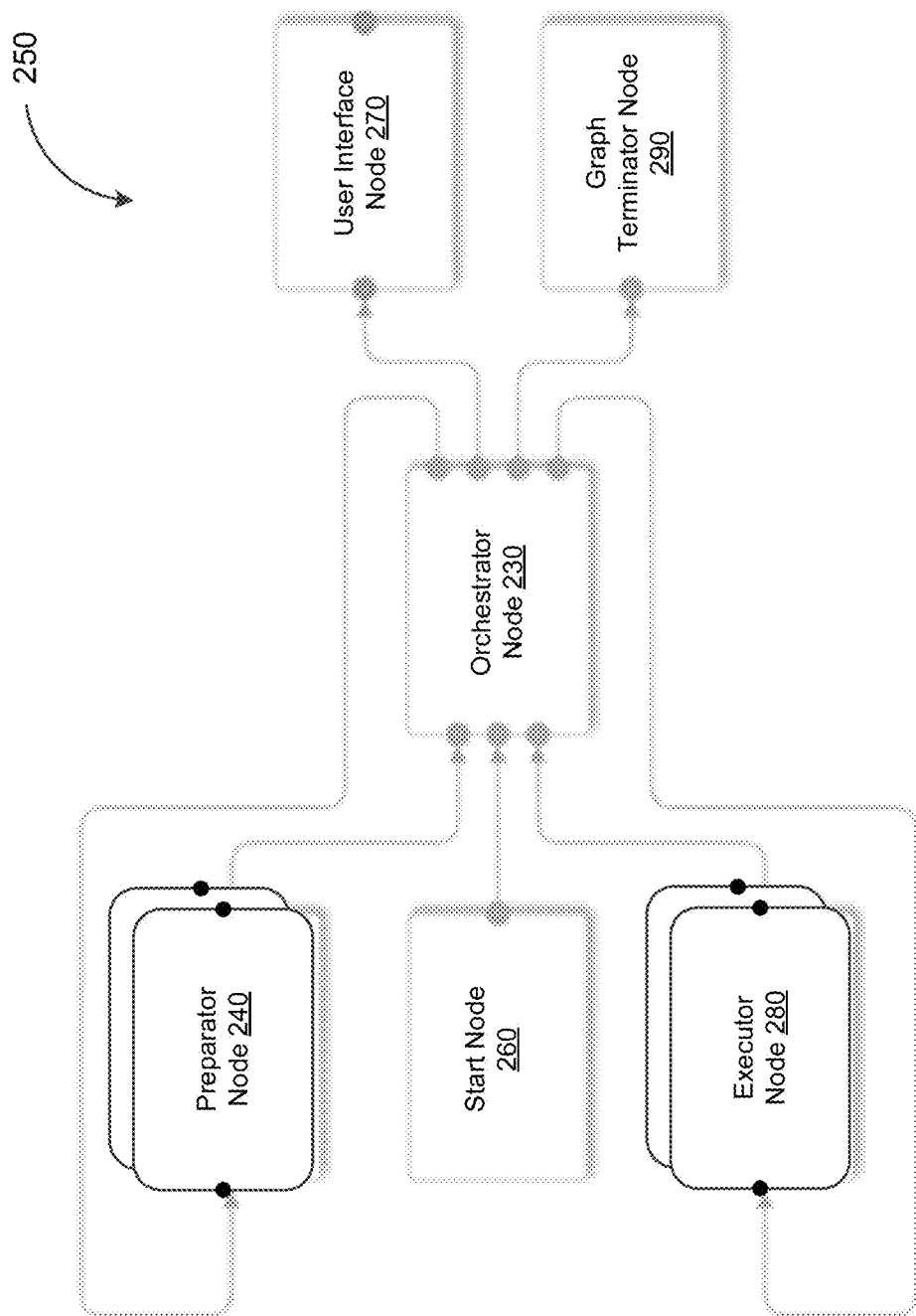
FIG. 2C depicts examples of operator nodes forming a data processing pipeline configured to generate a machine learning model, in accordance with some example embodiments.

In some example embodiments, a data processing pipeline may be constructed to include one or more specific operator nodes in order to implement a machine learning model trained to perform a cognitive task such as, for example, object identification, natural language processing, information retrieval, speech recognition, classification, and/or regression. FIG. 2C depicts examples of operator nodes forming a data processing pipeline 250 configured to generate a machine learning model, in accordance with some example embodiments. As shown in FIG. 2C, the data processing pipeline 250 may be constructed to include an orchestrator node 230 and one more preparator nodes such as, for example, a preparator node 240. Furthermore, the data processing pipeline 250 may be constructed to include one or more executor nodes including, for example, an executor node 280. Alternatively and/or additionally, the data processing pipeline 250 may be constructed to include one or more auxiliary operator nodes including, for example, a start node 260, a user interface node 270, and a graph terminator node 290. The start node 260 may receive an initial configuration to generate a machine learning model as specified, for example, by the user 125 at the client 120. Meanwhile, the user interface node 270 may be configured to generate and/or update the user interface 150 to display, at the client 120, a progress of executing the data processing pipeline 200. The graph terminator node 290 may be invoked to terminate the execution of the data processing pipeline 250.

In some example embodiments, the preparator node 240 may be configured to validate and preprocess an input dataset received, for example, from the client 120. Furthermore, the preparator node 240 may be configured to generate, based at least on the input dataset, a training dataset and a validation dataset. For example, the input dataset may include text associated with one or more errors reported to an issue tracking system. The preparator node 240 may validate the input dataset and terminate additional processing of the input dataset in response to identifying one or more errors present in the input dataset. Upon validating the input dataset, the preparator node 240 may preprocess the input dataset including by removing invalid rows and/or columns of data from the input dataset as well as encoding any text included in the input dataset. The preparator node 240 may partition the validated and preprocessed input dataset into a training dataset for training a machine learning model to perform text classification and a validation dataset for evaluating a performance of the trained machine learning model performing text classification.

In some example embodiments, the executor node 280 may be configured to execute, based on the training dataset and/or the validation dataset generated by the preparator node 240, one or more machine learning trials. Each machine learning trial may include applying, to the training dataset and/or the validation dataset, a machine learning model having a specific set of trial parameters. The set of trial parameters may include one or more parameters of the machine learning model such as, for example, the initial weights applied by the machine learning model prior to training. Furthermore, the set of trial parameters may include one or more hyper-parameters of the machine learning model including, for example, the learning rate (e.g. step size) of a neural network, the value of the constant k in a k-nearest neighbors clustering algorithm, the cost and sigma associated with a support vector machine, and/or the like. It should be appreciated that the executor node 280 may be configured to execute a sequence of machine learning trials, each of which including a different type of machine learning model and/or a different set of trial parameters. For instance, the executor node 280 may execute a first machine learning trial by at least applying, to the training dataset and/or the validation dataset, a first machine learning model having a first set of trial parameters. The executor node 280 may also execute a second machine learning trial by at least applying, to the training dataset and/or the validation dataset, the first machine learning model having a second set of trial parameters or a second machine learning model having a third set of trial parameters.

In some example embodiments, the orchestrator node 230 may be configured to coordinate the operations of the preparator node 240 and the executor node 280. The orchestrator node 230 may respond to receiving, from the start node 260, the initial configurations for implementing the machine learning model by at least triggering, at the preparator node 240, the generation of the training dataset and the validation dataset. The initial configuration may include, for example, a type of task (e.g., classification, regression, and/or the like), a target column (e.g., column in the training dataset corresponding to a ground-truth label), a target metric (e.g., accuracy), column names and/or types in the training dataset and the validation dataset, a computational resource budget (e.g., maximum execution time and/or the like), a path to an output directory, a path to the training dataset, a path to a validation dataset, and/or the like.

Upon receiving, from the preparator node 240, an indication that the preparator node 240 has generated the training dataset and the validation dataset, the orchestrator node 230 may determine a machine learning model including a set of model parameters and hyper-parameters for performing the task associated with the input dataset (e.g., classify text associated with an issue tracking system and/or the like). For example, the orchestrator node 230 may determine a machine learning model including a set of model parameters and hyper-parameters for performing the task associated with the input dataset by at least triggering, at the executor node 280, the execution of one or more machine learning trials, each of which including a different type of machine learning model and/or a different set of trial parameters. The orchestrator node 230 may trigger, at the executor node 280, a quantity of machine learning trials that is consistent with the computational resource budget set forth in the initial configurations for implementing the machine learning model. For instance, the orchestrator node 230 may trigger an additional machine learning trial based at least on a quantity of remaining computational resource being sufficient to support the execution of the additional machine learning trial.

In some example embodiments, the trial parameter set used for a machine learning trial may be selected randomly from a hyper-parameter space that includes parameters governing the configuration of the data processing pipeline 250 as well as the configuration of each node within the data processing pipeline 250. A machine learning model including a set of model parameters and hyper-parameters for performing the task associated with the input dataset may be identified by applying an information-based optimization technique (e.g., a Bayesian hyper-parameter optimizer and/or the like), which may start with a random set of trial parameters before incorporating the corresponding result to identify regions in the hyper-parameter space that are most likely to include the set of model parameters and hyper-parameters associated with the machine learning model that is identified, within the available time budget, as being most suitable for the task associated with the input dataset. With each successive update, the sampling of the hyper-parameter space may shift from a uniform sampling (e.g., from a uniform distribution of trial parameters to yield a random sampling in which each trial parameter has an equal probability of being sampled) to an information-weighted sampling using Bayesian (or other) methods.

The executor node 280 may execute the first machine learning trial including the first machine learning model having the first set of trial parameters and the second machine learning trial including the first machine learning model having the second set of trial parameters or the second machine learning model having the third set of trial parameters. Accordingly, the orchestrator node 230 may select, based at least on the respective performances of the first machine learning model having the first set of trial parameters, the first machine learning model having the second set of trial parameters, and/or the second machine learning model having the third set of trial parameters, the machine learning model including the set of model parameters and hyper-parameters for performing the task associated with the input dataset. Upon selecting the machine learning model including the set of model parameters and hyper-parameters for performing the task associated with the input dataset, the orchestrator node 230 may terminate the execution of the data processing pipeline 250 including by sending, to the graph terminator node 290, a message to terminate the execution of the data processing pipeline 250.

As noted, the executor node 280 may execute the first machine learning trial and the second machine learning trial in sequence. However, it should be appreciated that the data processing pipeline 250 may be constructed to include multiple executor nodes and that orchestrator node 230 may coordinate the operations of the multiple executor nodes executing multiple machine learning trials in parallel. Moreover, the data processing pipeline 250 may be constructed to include multiple preparator nodes and the orchestrator node 230 may coordinate the operations of multiple preparator nodes generating the input dataset and the validation dataset in parallel.

In some example embodiments, the orchestrator node 230, the preparator node 240, and the executor node 280 may communicate via one or more messages. However, these messages may exclude intermediate data such as, for example, the training dataset and the validation dataset generated by the preparator node 240. Instead, the orchestrator node 230, the preparator node 240, and the executor node 280 may exchange intermediate data via a shared persistence 115 accessible to the orchestrator node 230, the preparator node 240, and the executor node 280. For example, the orchestrator node 230 may store, in the shared persistence 115, at least a portion of the initial configurations that includes the input dataset associated with the specified task. Likewise, the preparator node 240 may store, in the shared persistence 115, the training dataset and the validation dataset generated based on the input dataset. Instead of sending the input dataset, the training dataset, and the validation dataset directly, the orchestrator node 230, the preparator node 240, and the executor node 280 may exchange the input dataset, the training dataset, and/or the validation dataset by at least sending messages indicating the availability of the input dataset, the training dataset, and/or the validation dataset in the shared persistence 115. Accordingly, the preparator node 240 may access the shared persistence 115 to retrieve the input dataset in order to generate the training dataset and the validation dataset while the executor node 280 may access the shared persistence 115 to retrieve the training dataset and the validation dataset for use during the execution of the one or more machine learning trials.

Figure 3A:
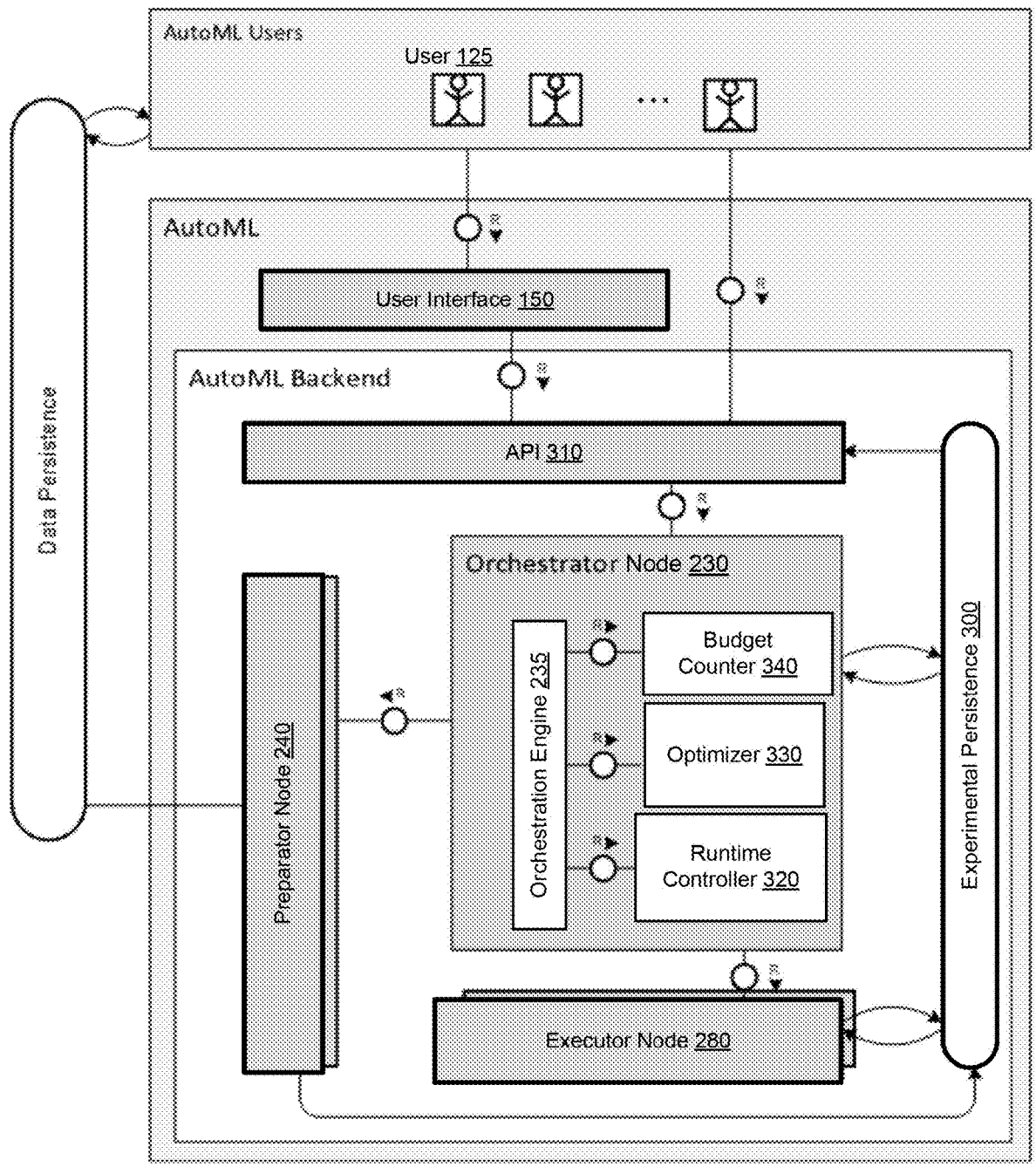
FIG. 3A depicts a block diagram illustrating an example communication flow between the operator nodes forming a data processing pipeline configured to generate a machine learning model, in accordance with some example embodiments.

FIG. 3A depicts a block diagram illustrating an example communication flow between the operator nodes forming the data processing pipeline 250 configured to generate a machine learning model, in accordance with some example embodiments. Referring to FIG. 3A, the orchestrator node 230, the preparator node 240, and the executor node 280 may exchange intermediate data by at least accessing an experiment persistence 300, which may form a part of the shared persistence 115 shown in FIG. 1. As shown in FIG. 3A, the user 125 at the client 120 may interact with the user interface 150 to specify, via an application programming interface 310, the initial configurations for the machine learning model performing a task such as, for example, object identification, natural language processing, information retrieval, speech recognition, classification, and/or regression. In response to receiving the initial configurations for the machine learning model, the orchestrator node 230 may trigger, at the preparator node 240, the generation of the training dataset to train the machine learning model to perform a specified task and the validation dataset to evaluating a performance of the trained machine learning model performing the specified task. The preparator node 240 may store, in the experiment persistence 300, the training dataset and the validation dataset. Moreover, the preparator node 240 may send, to the orchestrator node 230, the first message notifying the orchestrator node 230 of the availability of the training dataset and the validation dataset.

In response to the first message from the preparator node 240, the orchestrator node 230 may send, to the executor node 280, the second message to trigger the execution of one or more machine learning trials. For example, the executor node 280 may respond to the second message by at least executing the first machine learning trial including the first machine learning model having the first set of trial parameters and/or the second machine learning trial including the first machine learning model having the second set of trial parameters or the second machine learning model having the third set of trial parameters. The executor node 280 may further store, in the experiment persistence 300, the results of the machine learning trials corresponding, for example, to the respective performances of the first machine learning model having the first set of trial parameters, the first machine learning model having the second set of trial parameters, and/or the second machine learning model having the third set of trial parameters. In order to identify the machine learning model including the set of model parameters and hyper-parameters for performing the specified task, the orchestrator node 230 may at least access the experiment persistence 300 to evaluate the results of the machine learning trials relative, for example, to the target metric specified by the user 125 as part of the initial configurations for the machine learning model.

The data processing pipeline 250 including the orchestrator node 230, the preparator node 240, and the executor node 280 may be executed to perform feature extraction, feature pre-processing, and training of a machine learning model. For example, the feature extraction may be performed to generate numerical features based on one or more columns of data from the input dataset including by encoding categorical features and/or extracting values from the data fields in each column. The feature-preprocessing may include a normalization of values occupying one or more columns in the input dataset. Accordingly, the machine learning model may be trained by at least applying the machine learning model to the numerical columns generated by the feature extraction and/or the feature pre-processing.

In some example embodiments, the data processing pipeline 250 may be configured to adapt dynamically based on the metrics and/or configuration of the input dataset. Furthermore, the data processing pipeline 250 may adapt dynamically based on one or more previous processing operations in the data processing pipeline 250. As such, some operations may be omitted from the data processing pipeline 250 to reduce operation cost, minimize training time, and increase the accuracy of the resulting machine learning model. For example, whether the executor node 280 performs feature selection may be contingent upon the quantity of available features. That is, the executor node 280 may perform feature selection if more than a threshold quantity of features are available. The executor node 280 may also avoid subjecting embedded columns to any additional processing in order to avoid distorting the embedding space. In the event the input dataset does not include any columns with textual data, the executor node 280 may omit any text encoding, thereby reducing the hyper-parameter space. Moreover, the executor node 280 may also exclude the one or more column from the input dataset determined to have below-threshold information value such as, for example, columns with below threshold value target cross-entropy.

In some example embodiments, the quantization of a hyper-parameter may be adapted based on the metrics of the input dataset including, for example, the quantity of columns and/or the quantity of unique values across columns containing certain datatypes. As used herein, the "quantization" of hyper-parameter may refer to the discrete values that the hyper-parameter may take on during each machine learning trial. For example, if the hyper-parameter column sampling rate yields substantially the same results at 10% and at 12%, then the hyper-parameter column sampling rate may be varied at increments of 20% for each machine learning trial.

Figure 3B:
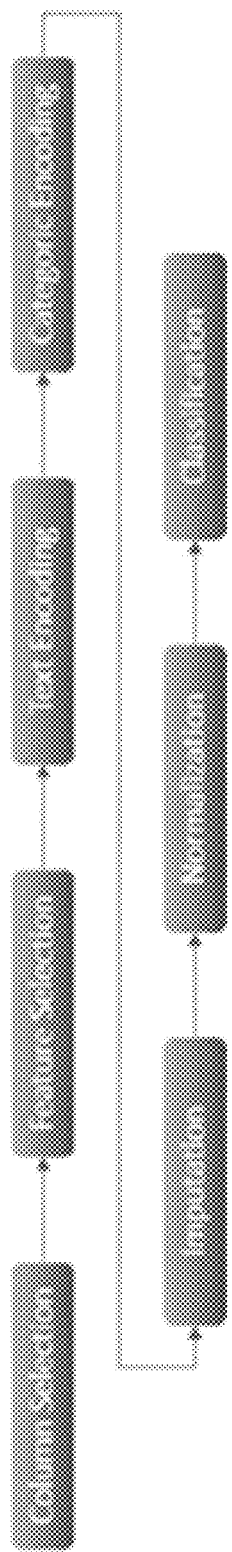
FIG. 3B depicts a flowchart illustrating examples of the data processing operations performed by an executor node forming a data processing pipeline configured to generate a machine learning model, in accordance with some example embodiments.

FIG. 3B depicts a flowchart illustrating examples of the data processing operations performed by the executor node 280 forming the data processing pipeline 250 configured to generate a machine learning model, in accordance with some example embodiments. In some example embodiments, the executor node 280 may respond to the second message from the orchestrator node 230 by at least accessing the shared persistence 115 to retrieve the training dataset and/or the validation dataset generated by the preparator node 240. The executor node 280 may perform, on the training dataset and/or the validation dataset, a sequence of data processing operations, each of which applying a different transformation on the training dataset and/or the validation dataset. As shown in FIG. 3B, the executor node 280 may perform data processing operations that include, as the example, a column selection operation, a feature selection operation, a text encoding operation, a categorical encoding operation, an imputation operation, a normalization operation, a classification operation, and/or the like.

In some example embodiments, the executor node 280 performing a single machine learning trial may generate a corresponding candidate machine learning model having a specific set of parameters and/or hyper-parameters. The executor node 280 may store, in the shared persistence 115 (e.g., the experiment persistence 300), the candidate machine learning model. Moreover, the executor node 280 may send, to the orchestrator node, the result of the machine learning trial, which may correspond to the performance of the candidate machine learning model operating on the validation dataset. For example, the executor node 280 may store, in the shared persistence 115 (e.g., the experiment persistence 300), the result of the machine learning trial such that the orchestrator node 230 may access the shared persistence 115 (e.g., the experiment persistence 300) to retrieve the result of the machine learning trial. As noted, the orchestrator node 230 may access the shared persistence 115 (e.g., the experiment persistence 300) in order to evaluate the results of one or more machine learning trials and identify a machine learning model including a set of model parameters and hyper-parameters for performing the task specified by the user 125 at the client 120.

Figure 3C:
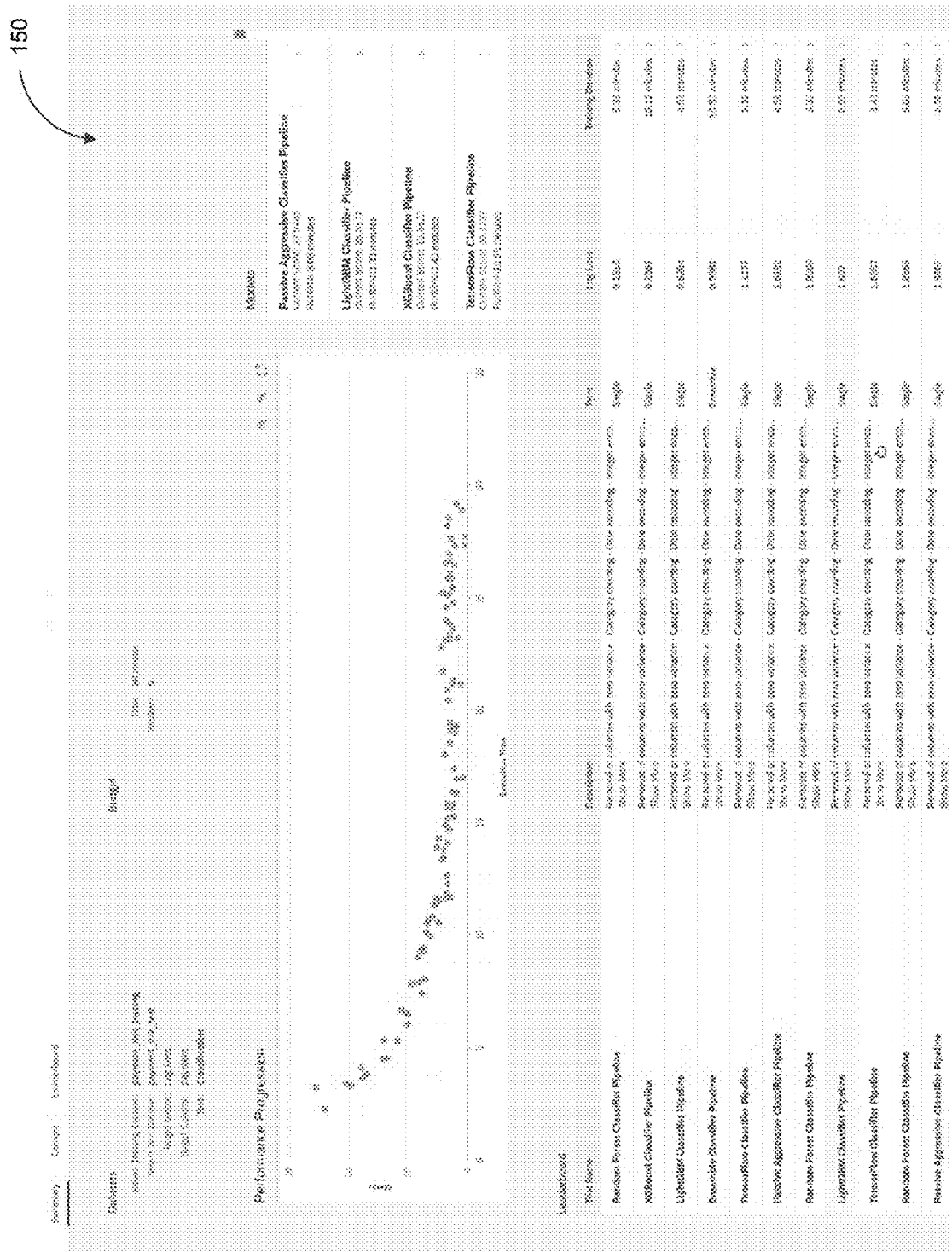
FIG. 3C depicts an example of a user interface, in accordance with some example embodiments.
Figure 3D:
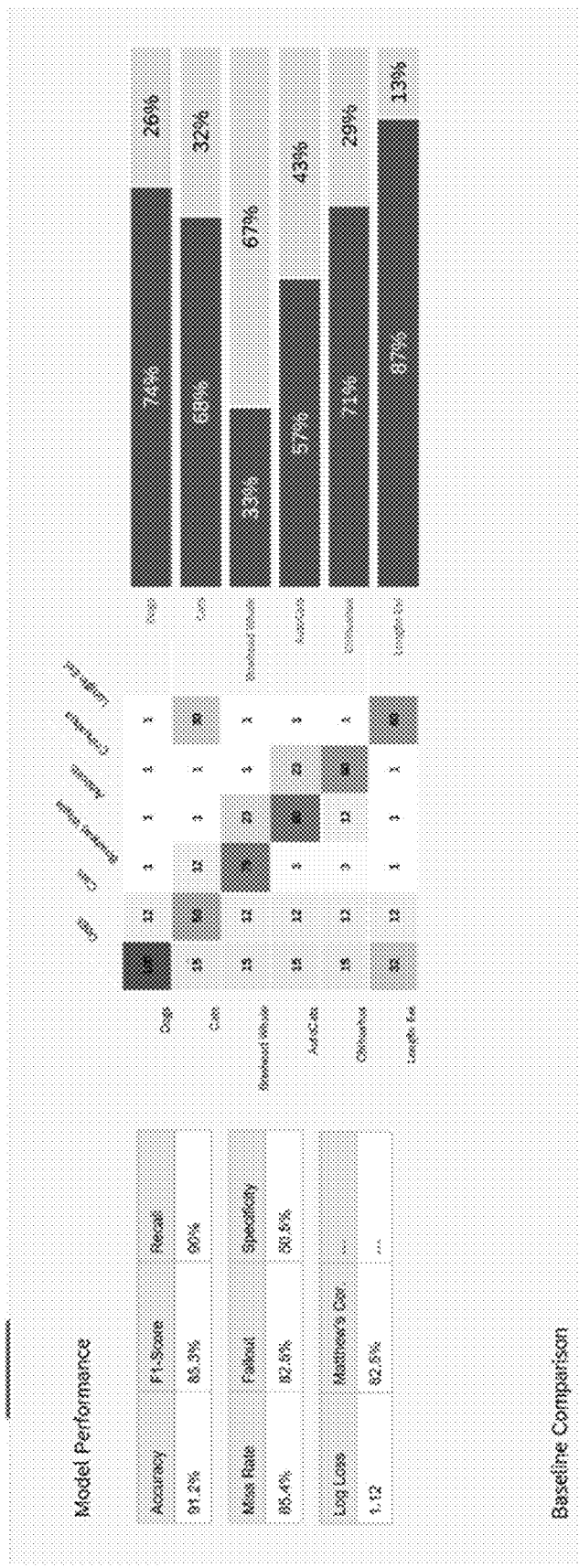
FIG. 3D depicts another example of a user interface, in accordance with some example embodiments.

FIGS. 3C-D depict examples of the user interface 150, in accordance with some example embodiments. As shown in FIGS. 3C-D, the user interface 150 may be updated to display, at the client 120, a progress as well as a result of the one or more machine learning trials. For example, the user interface 150 may be updated to display, at the client 120, a model accuracy, a calibration curve, a confusion matrix, a significance of each feature (e.g., a relevance of each column in the training dataset for a machine learning model), and/or the like. In the example of the user interface 150 shown in FIG. 3C, the progress and the results associated with multiple types of machine learning models may be sorted in order to identify the one or more machine learning model having a best result. FIG. 3D depicts an example of the user interface 150 displaying the progress and the result of a single type of machine learning model (e.g., an XGBoost Classifier).

Figure 4A:
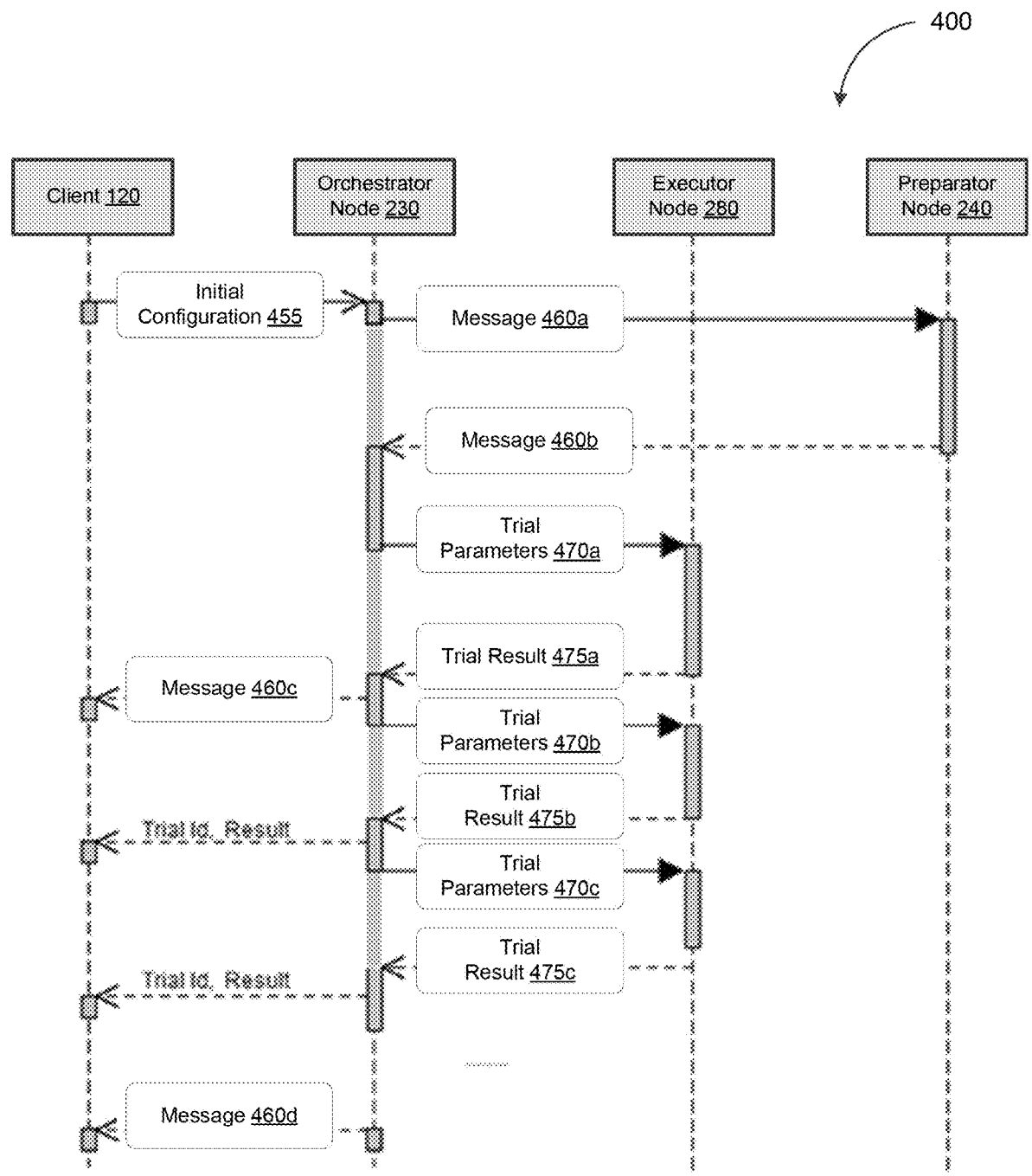
FIG. 4A depicts a sequence diagram illustrating an example of a process for generating a machine learning model trained to perform a task, in accordance with some example embodiments.

FIG. 4A depicts a sequence diagram illustrating a process 400 for generating a machine learning model trained to perform a task, in accordance with some example embodiments. Referring to FIGS. 1, 2A-C, 3A-C, and 4A, the process 400 may be performed by the pipeline engine 110 as part of executing the data processing pipeline 250 to generate a machine learning model having a set of parameters and/or hyper-parameters for performing a cognitive task such as, for example, object identification, natural language processing, information retrieval, speech recognition, classification, and/or regression.

The orchestrator node 230, for example, the orchestration engine 235, may receive, from the client 120, an initial configuration 455 for implementing a machine learning model to perform a cognitive task such as, for example, object identification, natural language processing, information retrieval, speech recognition, classification, and/or regression. In response to receiving the initial configuration 455 from the client 120, the orchestrator node 230 may trigger, at the preparator node 240, the generation of a training dataset for training the machine learning model to perform the task and a validation dataset for evaluating a performance of the machine learning model trained to perform the task. As shown in FIG. 4A, the orchestrator node 230 may trigger the generation of the training dataset and the validation dataset by at least sending, to the preparator node 240, a first message 460a. The preparator node 240 may respond to the first message 460a by generating the training dataset and the validation dataset as well as perform one or more preparatory tasks such as the embedding and/or encoding a variety of data (e.g., textual data, numerical data, spatial data, categorical data, and/or the like). When the preparator node 240 completes generating the training dataset and the validation dataset as well as the preparatory tasks, the preparator node 240 may send, to the orchestrator node 230, a second message 460b notifying the orchestrator node 230 of the availability of the training dataset and the validation dataset as well as the results of the preparatory tasks. The preparator node 240 may store the training dataset and the validation dataset in the shared persistence 115 (e.g., the experiment persistence 300) where the training dataset and the validation dataset may be accessible to the orchestrator node 230 and the executor node 280. As such, the preparator node 240 may avoid sending the training dataset and the validation dataset directly to the orchestrator node 230 in the second message 460b.

The orchestrator node 230 may respond to the second message 460b by at least triggering, at the executor node 280, the execution of a first machine learning trial. As shown in FIG. 4A, the orchestrator node 230 may trigger the execution of the first machine learning trial by at least sending, to the executor node 280, a first set of trial parameters 470a. The first set of trial parameters 470a may include one or more parameters of the machine learning model such as, for example, the initial weights applied by the machine learning model prior to training. Furthermore, the first set of trial parameters 470a may include one or more hyper-parameters of the machine learning model including, for example, the learning rate (e.g., step size) of a neural network, the value of the constant k in a k-nearest neighbors clustering algorithm, the cost and sigma associated with a support vector machine, and/or the like. The executor node 280 may execute the first machine learning trial by at least applying, to the training dataset and the validation dataset generated by the preparator node 240, a machine learning model having the first set of trial parameters 470a.

In some example embodiments, the orchestrator node 230 may continue to trigger the execution of additional machine learning trials if there are sufficient remaining computational resources (e.g., execution time and/or the like) to support the execution of additional machine learning trials. For example, FIG. 4A shows the orchestrator node 230 as sending, to the executor node 280, a second set of trial parameters 470b to trigger the execution of a second machine learning trial at the executor node 280 and a third set of trial parameters 470c to trigger the execution of a third machine learning trial at the executor node 280.

The executor node 280 may return, to the orchestrator node 230, a first trial result 475a of executing the first machine learning trial, a second trial result 475b of executing the second machine learning trial, and a third trial result 475c of executing the third machine learning trial. The first trial result 475a, the second trial result 475b, and the third trial result 475c may correspond to a performance of one or more machine learning models having the first set of trial parameters 470a, the second set of trial parameters 470b, and the third set of trial parameters 470c. Moreover, it should be appreciated that the executor node 280 may send the first trial result 475a, the second trial result 475b, and the third trial result 475c to the orchestrator node 230 by at least storing the first trial result 475a, the second trial result 475b, and the third trial result 475c in the shared persistence 115 (e.g., the experiment persistence 300).

According to some example embodiments, the executor node 280 may evaluate the first trial result 475a, the second trial result 475b, and/or the third trial result 475c relative to the target metric specified by the user 125 as part of the initial configurations for the machine learning model in order to identify the machine learning model having the set of parameters and/or hyper-parameters for performing the task. The executor node 280 may select, for example, the first set of trial parameters 470a and the machine learning model associated with the first set of trial parameters 470a based at least on the first trial result 475a being more optimal with respect to the target metric specified by the user 125 than the second trial result 475b and the third trial result 475c. The target metric may be an accuracy of the machine learning model, in which case the first trial result 475a may be more optimal by exhibiting a higher target metric than the second trial result 475b and the third trial result 475c. Alternatively and/or additionally, the target metric may be a log loss, in which case the first trial result 475a may be more optimal by exhibiting a lower target metric than the second trial result 475b and the third trial result 475c In the example shown in FIG. 4A, the orchestrator node 230 may send, to the client 120, one or more messages indicating a status of the machine learning trials. For instance, the orchestrator node 230 may send, to the client 120, a third message 460c including the first trial result 475a of the first machine learning trial executed by the executor node 280. Alternatively and/or additionally, the orchestrator node 230 may send, to the client 120, a fourth message 460d including the third trial result 475c of the third machine learning trial executed by the executor node 280 as well as an indication of a completion of the machine learning trials. The orchestrator node 230 may communicate with to the client 120 via the user interface node 270, which may be configured to generate and/or update the user interface 150 to display, at the client 120, at least a portion of the content of the third message 460c and/or the fourth message 460d.

Referring again to FIG. 3A, the orchestrator node 230 of the data processing pipeline 250a may include a runtime estimator 320 as well as an optimizer 330 and a budget counter 340. The runtime estimator 320 may be configured to determine a runtime estimate for the data processing pipeline 250a executing one or more machine learning trials, each of which including a different type of machine learning model and/or a different set of trial parameters. The runtime estimate may enable the identification of one or more machine learning trials that may be executed without exceeding an available time budget. In some example embodiments, the optimizer 330 may optimize the execution of the one or more machine learning trials before the orchestrator node 230 triggers, at the executor node 280, the execution of the one or more machine learning trials. The optimizer 330 may optimize the execution of the one or more machine learning trials to reduce overhead, accommodate large training datasets, and eliminate inconsistencies in the result of executing the data processing pipeline 250. The orchestrator node 230 may continue to trigger the execution of successive machine learning trials until the budget counter 340 signals a depletion of the available time budget.

Figure 4B:
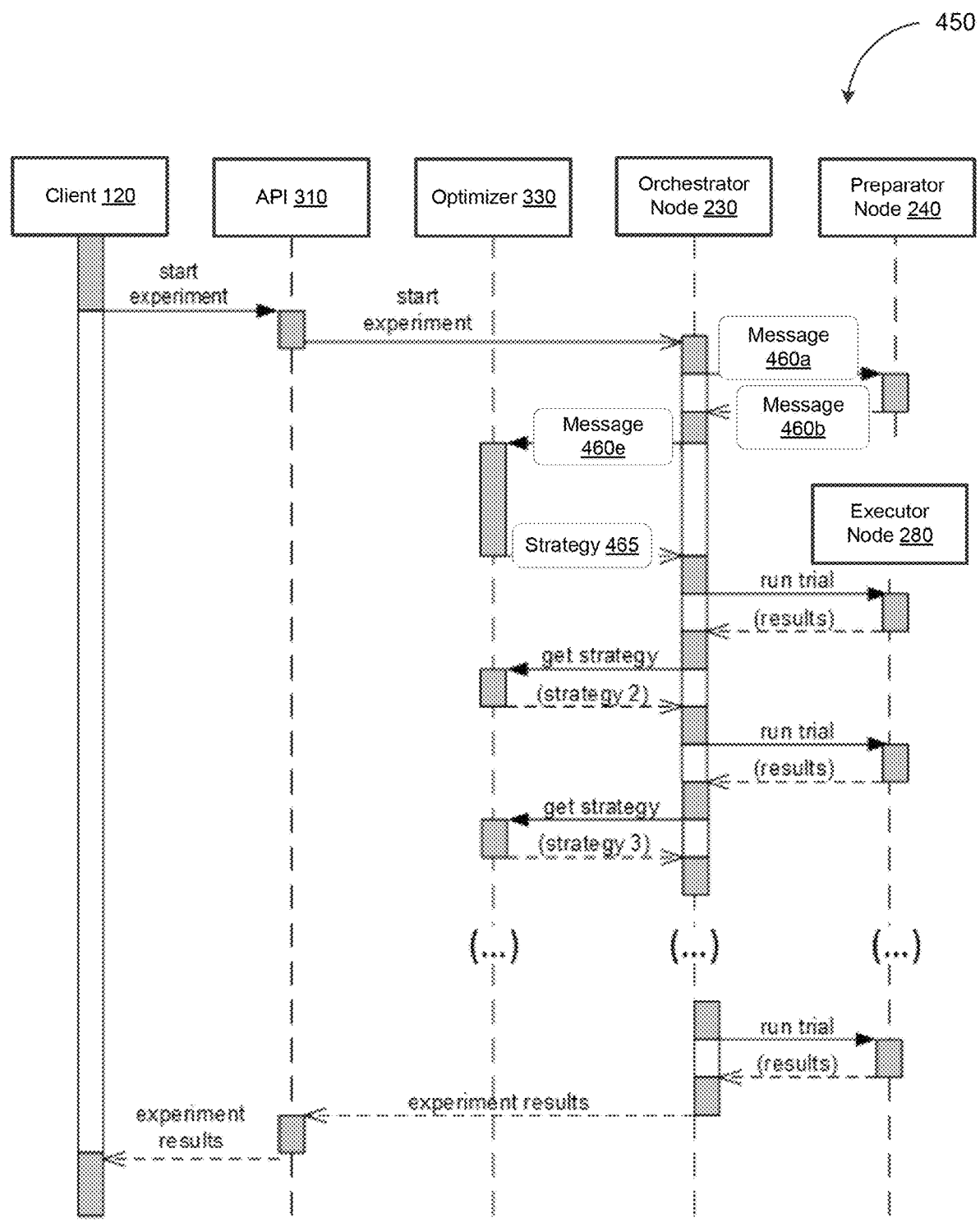
FIG. 4B depicts a sequence diagram illustrating another example of a process for generating a machine learning model trained to perform a task, in accordance with some example embodiments.

To further illustrate, FIG. 4B depicts a sequence diagram illustrating another example of a process 450 for generating a machine learning model trained to perform a task, in accordance with some example embodiments. As shown in FIG. 4B, the orchestrator node 230, for example, the orchestration engine 235, may trigger the generation of the training dataset and the validation dataset by at least sending, to the preparator node 240, the first message 460a. The preparator node 240 may respond to the first message 460a by generating the training dataset and the validation dataset as well as perform one or more preparatory tasks such as the embedding and/or encoding a variety of data (e.g., textual data, numerical data, spatial data, categorical data, and/or the like). When the preparator node 240 completes generating the training dataset and the validation dataset as well as the preparatory tasks, the preparator node 240 may send, to the orchestrator node 230, the second message 460b to notify the orchestrator node 230 of the availability of the training dataset and the validation dataset as well as the results of the preparatory tasks. As noted, the training dataset and the validation dataset may be stored in the shared persistence 115 (e.g., the experiment persistence 300) where the training dataset and the validation dataset may be accessible to the orchestrator node 230 and the executor node 280.

Upon receiving the second message 460b from the preparator node 240, the orchestrator node 230, for example, the orchestration engine 235, may send, to the optimizer 330, one or more messages requesting an optimization strategy for executing the one or more machine learning trials such as, for example, the first machine learning trial having the first set of trial parameters 470a, the second machine learning trial having the second set of trial parameters 470b, the third machine learning trial having the third set of trial parameters 470c, and/or the like. For example, as shown in FIG. 4B, the orchestration engine 235 may send, to the optimizer 330, a fifth message 460e and the optimizer 330 may respond by sending, to the orchestration engine 235, an optimization strategy 465 for executing a machine learning trial. The orchestration engine 235 may trigger, at the executor node 280, the execution of the machine learning trial, which may be executed in accordance with the corresponding set of trial parameters and optimization strategy.

Figure 5A:
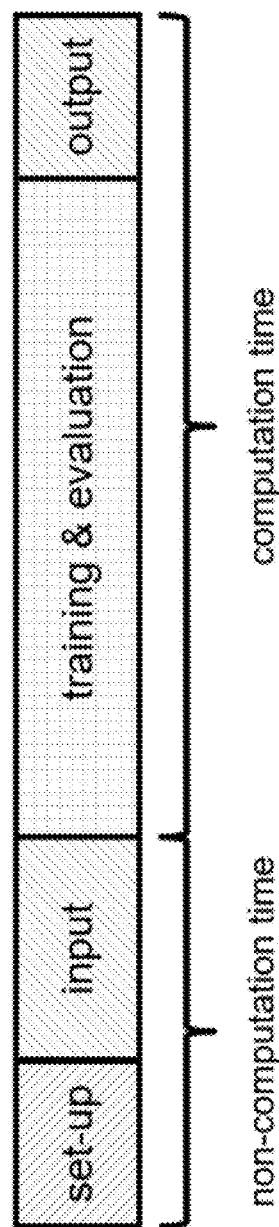
FIG. 5A depicts a schematic diagram illustrating the various components of runtime, in accordance with some example embodiments.

As shown in FIG. 5A, the total runtime $time_{total}$ for executing a machine learning trial may include non-computation time and computation time. The non-computation time component of the total runtime $time_{total}$ may include a set-up time $time_{setup}$ associated with provisioning a computing instance and starting an execution of the machine learning trials. The set-up time $time_{setup}$ may correspond to a quantity of time required to deploy and/or start the executor node 280. For example, the set-up time may correspond to a quantity of time elapsed between a first time when a set of trial parameters is sent to the executor node 280 and a second time when the executor node 280 executes a corresponding machine learning trial. The non-computation time component of the total runtime $time_{total}$ may also include an input time $time_{input}$ for transferring the training dataset and/or the validation dataset from a central storage system, for example, the shared persistence 115, to a local computing instance including the experimental persistence 300. Meanwhile, the computation time component of the total runtime $time_{total}$ may include a training and evaluation time $time_{model}$ during which the computations associated with the machine learning trial are performed including the training of a corresponding machine learning model and the evaluation of its performance. The computation time component of the total runtime $time_{total}$ may also include an output time $time_{output}$ corresponding to a quantity of time required to time to write, to a central storage system such as the shared persistence 115, a result of the machine learning model including the trained machine learning model, the output of the machine learning model, and the corresponding log files.

Figure 5B:
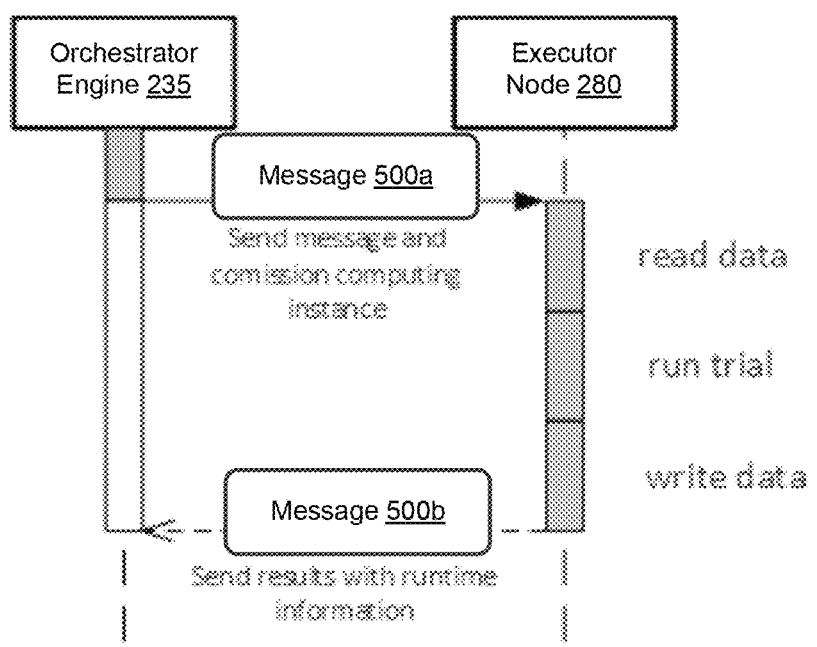
FIG. 5B depicts a sequence diagram illustrating an example of an extended message exchange, in accordance with some example embodiments.

FIG. 5B depicts a sequence diagram illustrating an example of an extended message exchange, in accordance with some example embodiments. As shown in FIG. 5B, the orchestration engine 235 of the orchestrator node 230 may send, to the executor node 280, a first message 500a triggering the execution of a machine learning trial before receiving, from the executor node 280, a second message 500b conveying a result of the machine learning model. The first message 500a and/or the second message 500b may be extended to include timing information associated with the set-up time $time_{setup}$, input time $time_{input}$, training and evaluation time $time_{model}$, and output time $time_{output}$ incurred by the executing of the machine learning trial. According to some example embodiments, the set-up time $time_{setup}$, input time $time_{input}$, training and evaluation time $time_{model}$, and output time $time_{output}$ associated with the machine learning trial may be recorded by the runtime estimator 320 for further runtime analysis and time budget allocation.

When multiple sets of trial parameter are sent to the executor node 280 at once, the non-computation time $time_{non-computation}$ including the set-up time $time_{setup}$ and the input time $time_{input}$ may remain constant while the computation time $time_{computation}$ including the training and evaluation time $time_{model}$ and the output time $time_{output}$ may scale in accordance with the quantity of trial parameter sets. As such, for an $n_{trials}$ quantity of trial parameter sets that are sent simultaneously to the executor node 280, the total runtime $time_{n_{trials}}$ may be approximated based on Equation (1) below.

$$time_{n_{trials}} = time_{setup} + time_{input} + \sum\nolimits_{i=1}^{n_{trials}} \left(time_{model}^i + time_{output}^i\right) = \qquad (1)$$
$$t_{non-computation} + \sum\nolimits_{i=1}^{n_{trials}} time_{computation}^i$$

Figure 6A:
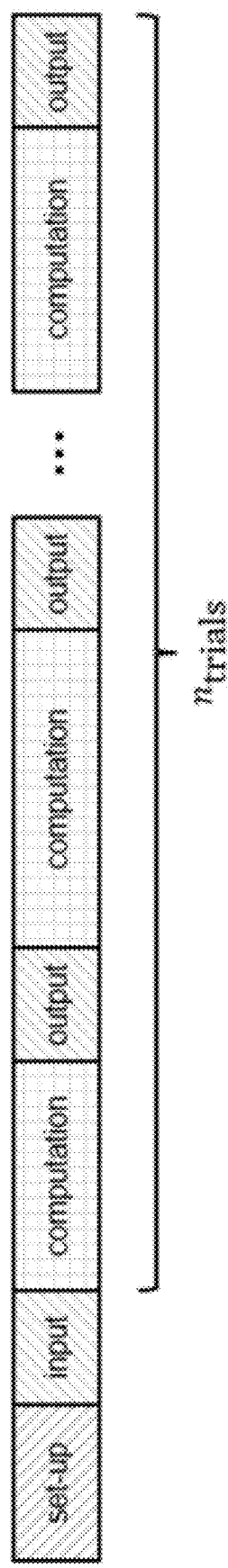
FIG. 6A depicts a schematic diagram illustrating a runtime associated with a pooling of multiple machine learning trials, in accordance with some example embodiments.
Figure 6B:
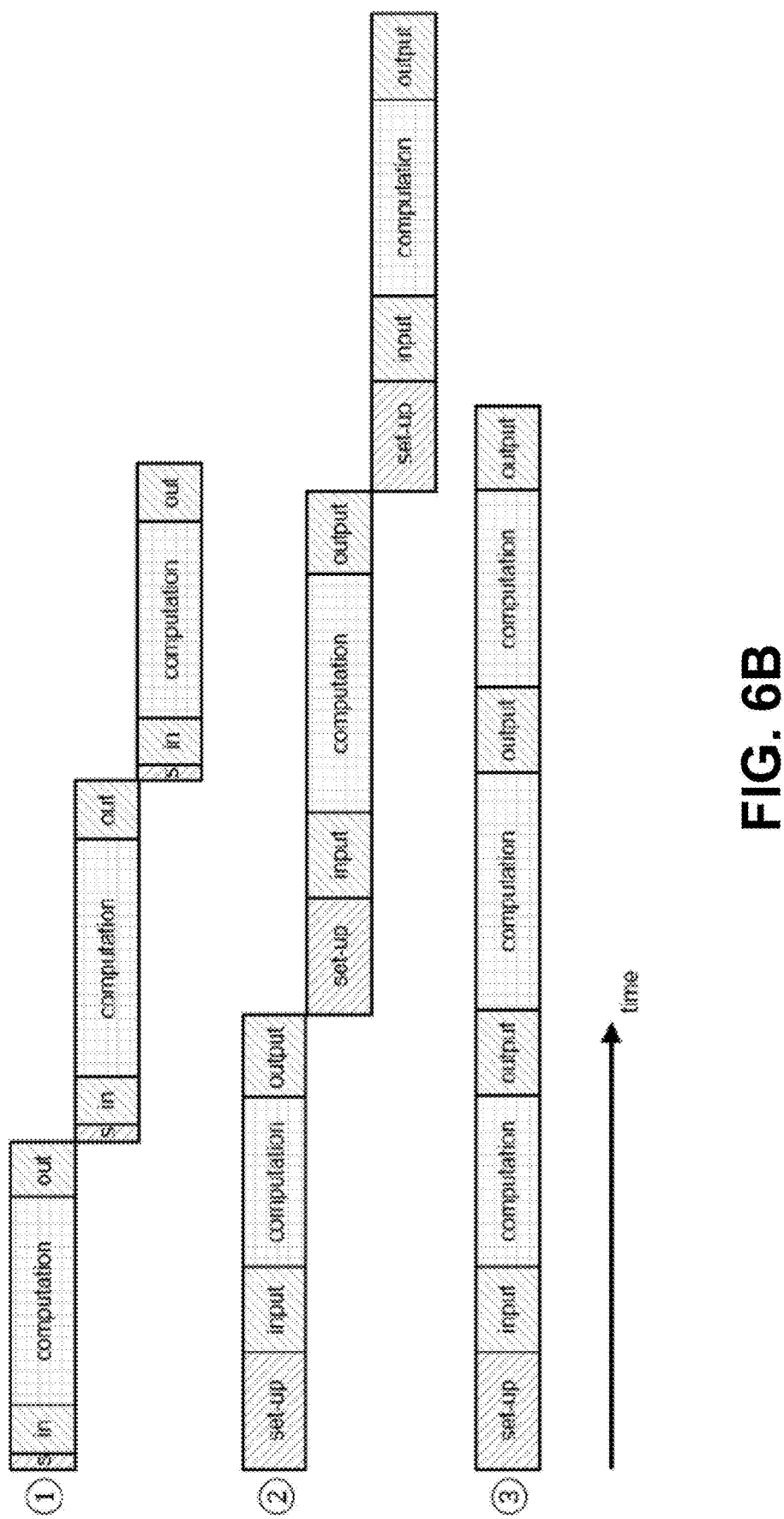
FIG. 6B depicts a schematic diagram illustrating the effects of increasing overhead, in accordance with some example embodiments.

The non-computation time $time_{non-computation}$, including the set-up time $time_{setup}$ and the input time $time_{input}$, may constitute the overhead of executing a machine learning trial. An optimal allocation of an available time budget may be achieved when the overhead imposed by the non-computation time $time_{non-computation}$ is minimized and a maximum proportion of the available time budget is used towards the computation time $time_{computation}$. To further illustrate, FIG. 6A depicts a schematic diagram illustrating a runtime associated with a pooling of multiple machine learning trials, for example, at a single executor node 280. FIG. 6B depicts a schematic diagram illustrating the effects of increasing overhead, in accordance with some example embodiments. As shown in FIG. 6B, when the overhead is low, as in Example 1, each machine learning trial may be executed individually with a separate trial parameter set, with the Bayesian hyper-parameter optimizer being updated after the execution of each machine learning trial. However, when the overhead increases, it may become more efficient to pool multiple machine learning trials, for example, by sending multiple trial parameter sets to the same executor node 280 at once (as in Example 3) instead of executing each of the machine learning trials separately (as in Example 2).

Although the pooling of multiple machine learning trials may minimize the non-computation time $time_{non-computation}$ overhead, particularly the set-up time $time_{setup}$, the frequency of updates to the Bayesian hyper-parameter optimizer may decrease. For example, instead of being updated after each machine learning trial, the Bayesian hyper-parameter optimizer may be updated after every $n_{trial}$ quantity of machine learning trials. Because multiple sets of trial parameters are being sampled at once without any intervening updates, the convergence to a set of model parameters and hyper-parameters may be slower. As such, to pool an $n_{trial}$ quantity of machine learning trials as an optimization to reduce the overhead associated with the non-computation time $time_{non-computation}$, an optimal quantity $n_{trial}$ of pooled machine learning trials may be determined to still maximize the time required to identify a machine learning model with a set of model parameters and hyper-parameters.

In some example embodiments, the optimizer 330 may optimize the execution of one or more machine learning trials by at least identifying, based at least on a task metadata (e.g., statistical information on the input dataset and user configuration), an available time budget, and a list of trial parameter sets, one or more corresponding machine learning trials for pooling. For example, the optimizer 330 may determine, by at least querying the runtime estimator 320, an expected non-computation time $time_{non-computation}$ and computation time $time_{computation}$ for each machine learning trial (e.g., set of trial parameters). A pool having an $n_{trial}$ quantity of machine learning trials may be identified by adding, to the pool of machine learning trials, one or more machine learning trials until the ratio of computation time $time_{computation}$ to non-computation time $time_{non-computation}$ for the pool exceeds a threshold value (e.g., 90%) and/or the quantity of machine learning trials in the pool exceeds a threshold value (e.g., 10). The orchestrator node 230, for example, the orchestration engine 235, may receive, from the optimizer 330, the pool of machine learning trials, for example, as part of the optimization strategy 465 for executing the one or more machine learning trials.

Figure 6C:
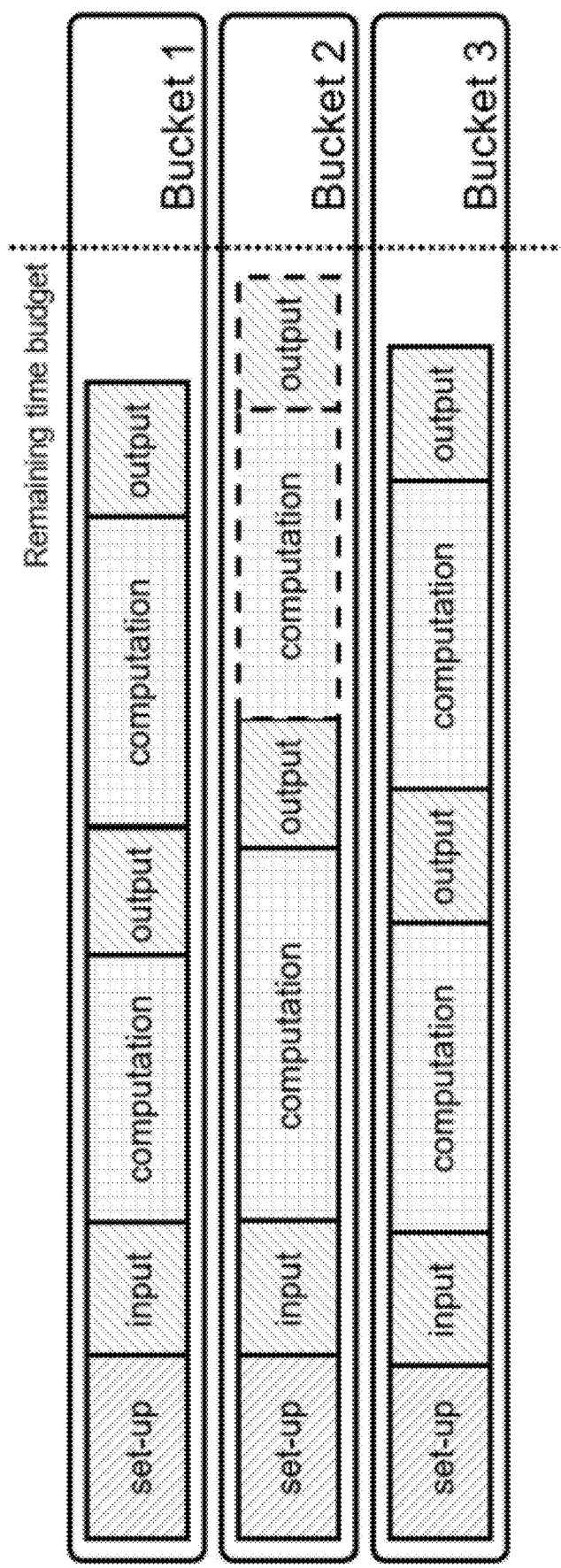
FIG. 6C depicts a schematic diagram illustrating an example of machine learning trials being grouped for parallel execution, in accordance with some example embodiments.

In some example embodiments, the optimizer 330 may further optimize the execution of one or more machine learning trials by at least identifying one or more pools of machine learning trials for parallel execution, for example, at multiple executor nodes 280. For example, the optimizer 330 may group the pools of $n_{trial}$ quantity of machine learning trials into a k quantity of buckets as shown in FIG. 6C for parallel execution at a k quantity of executor nodes 280. The optimizer 330 may apply a greedy strategy when grouping the machine learning trials for parallel execution. For instance, the optimizer 330 may assign, to a bucket of machine learning trials having a least runtime, a machine learning trial if the addition of the machine learning trial does not cause the runtime of the bucket to exceed an available time budget. Moreover, the optimizer 330 may determine a total runtime $time_{total}$ for the bucket with the addition of the machine learning trial as a sum of the non-computation time $time_{non-computation}$ plus a sum of the computation time $time_{computation}$ for all the machine learning trials assigned to the bucket. The optimizer 330 may drop the machine learning trial if no bucket is available to accommodate the machine learning trial. The optimizer 330 may determine that the group of machine learning trials into the k quantity of buckets is complete when all of the machine learning trials have been assigned (or dropped) and/or when the k quantity of buckets are full.

In some example embodiments, the orchestrator node 230, for example, the orchestration engine 235, may distribute the trial parameter sets based on the pooling and grouping determined by the optimizer 330. For example, the trial parameter sets associated with the $n_{trial}$ quantity of machine learning trials assigned to each of the k quantity of buckets may be sent to one of the k quantity of executor nodes 280 to trigger the execution of the corresponding machine learning trials. It should be appreciated that the pooling and grouping determined by the optimizer 330 may ensure an optimal allocation of the available time budget in which a maximum proportion of the available time budget is used towards the computation time $time_{computation}$.

In some example embodiments, the optimizer 330 may optimize the execution of one or more machine learning models by at least sub-sampling of the training dataset generated by the preparator node 240 to accommodate large training datasets. As noted, training a machine learning model with a large training dataset may benefit the accuracy and robustness of the machine learning model but the available time budget may not always accommodate training with a large training dataset. As such, the optimizer 330 may determine, based at least on a size, a complexity, and a runtime estimate associated with the input dataset used to generate the training dataset, whether the size of the training dataset exceeds a threshold to require sub-sampling. If the size of the training dataset exceeds the threshold, the optimizer 330 may sub-sample the training dataset such that at least a first set of one or more machine learning trials are executed based on a sub-sample of the training dataset instead of the full training dataset. The sub-sample of the training dataset may be stratified to ensure that each target label is present in the sub-sample of the training dataset at least once.

Subsequent to executing the first set of machine learning trials using the sub-sample of the training dataset, the optimizer 330 may identify one or more candidate machine learning models (and optimal sets of model parameters and hyper-parameters) having the best performance. If there remains available time budget, these candidate machine learning models may be subjected to additional training including by executing a second set of one or more machine learning trials using the full training dataset. A machine learning model for performing a task (including a set of model parameters and hyper-parameters) may be identified based at least on a result of the machine learning trials executed using the full training dataset. However, if the available time budget cannot accommodate additional training based on the full training dataset, a machine learning model may be identified based on the results of the machine learning trials executed using the sub-sampled training dataset.

In some example embodiments, the optimizer 330 may determine a sub-sampling ratio, which may correspond to the proportion of the training dataset used to execute at least the portion of the machine learning trials. An optimal sub-sampling ratio may be determined based at least on the available time budget and the runtime estimate associated with various proportions of the training dataset. For example, the optimizer 330 may analyze the runtime associated with various sub-sampling ratios including by generating various candidate sub-samples of the training dataset having different quantities of rows in the task metadata but constant values for other dataset statics and task metadata. The quantity of rows in each candidate sub-sample may correspond to the product of the quantity of rows in the full training dataset and a different sub-sampling ratio. Moreover, the optimizer 330 may determine the runtime for each candidate sub-sample by at least querying the runtime estimator 320 based on the corresponding dataset statistics, task metadata, and trial parameter set.

To determine an optimal sub-sampling ratio, the optimizer 330 may apply a bisection technique in which each successive candidate sub-sample of the training dataset includes half (or a different percentage) of one or more previous sub-samples. The optimizer 330 may continue to bisect the training dataset until reaching a sub-sampling ratio that yields a runtime that no more than a threshold portion (e.g., 50% and/or the like) of the available time budget. It should be appreciated that a portion of the available time budget may be preserved to ensure sufficient time budget to train on the full training dataset. Moreover, the optimizer 330 may impose a minimum sub-sample size by not performing more than a threshold quantity of bisections. For example, if the optimizer 330 is configured to not perform more than 10 bisections, the minimum sub-sample size may be $0.5^{10}$ of the total quantity of rows in the full training dataset.

To further illustrate, Table 1 below depicts an example of the bisection technique to determine an optimal sub-sampling ratio based on the corresponding runtime estimate for each bisected portion of the training dataset. In the example shown in Table 1, the full training dataset may include 100,000 rows and the available time budget may be 30 minutes. The sub-sampling ratio may be determined to ensure that the machine learning trials executed using the sub-sampled training dataset may be completed within 15 minutes (or another portion of the available time budget). As shown in Table 1, when the optimizer 330 determines that a first runtime associated with a first sub-sample ratio (e.g., 0.5) exceeds the threshold portion of the available time budget but a second runtime associated with a second sub-sample ratio (e.g., 0.25) that is a bisection of the first sub-sample ratio does not exceed the threshold portion of the available time budget, the optimizer 330 may query the runtime estimator 320 to determine a third runtime for a third sub-sample ratio that corresponds to a bisection of the first sub-sample ratio and the second sub-sample ratio. Table 1 further shows the imposition of a minimum sub-sample size where the full training dataset is bisected no more than five times. Accordingly, a sub-sampling ratio of 0.3125 is the optimal sub-sampling ratio for satisfying the 15-minute threshold criterion.

| Bisection | Sub-Sampling Ratio | Estimated Runtime [min] |
|---|---|---|
| 1 | 0.5 | 25.7 |
| 2 | 0.25 | 10.4 |
| 3 | 0.375 | 17.3 |
| 4 | 0.3125 | 14.7 |
| 5 | 0.34375 | 15.5 |

In addition to a sub-sampling ratio, the optimizer 330 may also determine a switch point corresponding to an end of training on the sub-sample of the training dataset ends and a start of training on the full training dataset. The machine learning model may be determined by training the machine learning model at least once on the full training dataset. As such, the optimizer 330 may determine a switch point for stopping the exploration of the hyper-parameter space using the sub-sampled training dataset. For example, whenever the orchestrator node 230 sends, to the executor node 280, a new trial parameter set, the optimizer 330 may first evaluate whether the remaining time budget can accommodate the already processed trial parameter sets if the corresponding machine learning trials are run on the full training dataset. The runtime estimate for these machine learning trials may be determined by the runtime estimator 320. If the sum of those runtime estimates exceeds the remaining time budget, the optimizer 330 may determine that a switch point has been reached.

Upon reaching the switch point, the orchestrator node 230 may begin triggering the execution of machine learning trials on the full training dataset. When the sub-sampling ratio is low and only a small fraction of the full training dataset is used for the initial exploration of the hyper-parameter space, the optimal set of model parameters and hyper-parameters may be different than those associated with the full training dataset. Accordingly, the trial parameter sets having the best performance may be used as a foundation for additional optimization based on the full training dataset. For example, upon reaching the switch point, the optimizer 330 may identify an x quantity of trial parameter sets yielding a best performance. Amongst this x quantity of trial parameter sets, the optimizer 330 may further select, for each candidate machine learning model, a y quantity of trial parameter sets having the best performance. Machine learning trials with these trial parameter sets may be executed a second time on the full training dataset before a machine learning model with a set of model parameters and hyper-parameters are identified based on the corresponding results.

In the event there is still additional time budget after the machine learning trials executed on the full training dataset, hyper-parameter optimization may continue with those sets of model parameters and hyper-parameters that exhibited the best performance on the full training dataset. To avoid a new exploration of the full hyper-parameter space, the hyper-parameter space may be restricted by selecting only those portions of the machine learning pipeline (e.g., preprocessing modules, machine learning models, and/or the like) that appeared in the re-run trial parameter sets. For example, a Naïve Bayes algorithm or one-hot encoding may not be re-run again if the corresponding modules were not part of the top trial parameter sets.

Table 2 depicts the selection of trial parameter sets for training on the full training dataset. In the example show in Table 2, the optimizer 330 may select 25 trial parameter sets with the best performance before selecting, within this top 25 trial parameter sets, five trial parameter sets having the best performance for each type of machine learning model for additional training. As such, trial parameter no. 32, although ranked $7^{th}$ overall, is not selected because it is the $6^{th}$ best trial parameter set for a random forest machine learning model.

| Rank | Trial ID | Algorithm | Re-Run? |
|---|---|---|---|
| 1 | 42 | Random Forest | Yes |
| 2 | 65 | Random Forest | Yes |
| 3 | 3 | XGBoost | Yes |
| 4 | 10 | Random Forest | Yes |
| 5 | 7 | Random Forest | Yes |
| 6 | 25 | Random Forest | Yes |
| 7 | 32 | Random Forest | No |
| ... | ... | | |
| 25 | 30 | LightGBM | Yes |
| 26 | 23 | Majority Voter | No |

In some example embodiments, the optimizer 330 may further optimize the execution of the data processing pipeline 250 to avoid a tendency for information based hyper-parameter optimization, such as Bayesian optimization, to converge prematurely to a local minima. This premature convergence may introduce inconsistencies in the result of the data processing pipeline 250 including inaccuracies and uncertainties in the machine learning model (and optimal sets of model parameters and hyper-parameters) identified by the execution of the data processing pipeline 250. As such, the optimizer 330 may apply optimizations to encourage the exploration of the full hyper-parameter space during the execution of the data processing pipeline 250.

In some example embodiments, the optimizer 330 may be configured to detect a convergence to a local optimum when performance of the machine learning trials do not improve over a threshold quantity of successive machine learning trials. In response to detecting the convergence to the local optimum, the optimizer 330 may increase the proportion $p_{rand}$ of trial parameter sets retrieved via random sampling based on Equation (2) below. The orchestrator node 230 may generate, based at least on the proportion $p_{rand}$, a trial parameter set that the executor 280 may use to execute a subsequent machine learning trial. For example, the orchestrator node 230 may generate the trial parameter set by sampling, in accordance with the proportion $p_{rand}$, from either a uniform distribution or using the Bayesian hyper-parameter optimizer (or another information based hyper-parameter optimizer). It should be appreciated that sampling from the uniform distribution may generate a random sampling of trial parameters in which each trial parameter has an equal probability of being sampled. Contrastingly, using the Bayesian hyper-parameter optimizer (or another information based hyper-parameter optimizer) may generate an information-weighted sampling in which the sampled trial parameters are determined at least in part by the results of previous machine learning trials.

$$p_{rand}(x) = \begin{cases} p_{min}, & x \le x_{min.threshold} \\ ax+b, & x_{min.threshold} < x \le x_{max.threshold} \\ p_{max}, & x \ge x_{max.threshold} \end{cases} \quad (2)$$

wherein x may denote a quantity of machine learning trials without improvement. The linear interpolation between the two thresholds may be defined as below to provide continuity at the thresholds.

$$p_{rand}(x_{min.threshold}) = p_{min}$$

$$p_{rand}(x_{max.threshold}) = p_{max}$$

In the Equation (2) above, the proportion $p_{rand}$ may correspond to the proportion of the trial parameter set sampled from the uniform random distribution. The orchestrator node 230 may generate trial parameter sets to include a first proportion $p_{min}$ of trial parameters when the quantity x of machine learning trials that have been executed without an improvement in performance does not exceed a first threshold quantity $x_{min.threshold}$. While the quantity x of machine learning trials that have been executed without an improvement in performance exceeds the first threshold quantity $x_{min.threshold}$ but does not exceed a second threshold quantity $x_{max.threshold}$, the orchestrator node 230 may generate trial parameter sets to include a second proportion of trial parameters sampled from the uniform distribution. As shown in Equation (2), this second proportion ax+b may be defined to be linearly proportional to the quantity x of machine learning trials that have been executed without an improvement in performance. When the quantity x of machine learning trials that have been executed without an improvement in performance is equal to or exceeds a third threshold quantity $x_{max.threshold}$, the orchestrator node 230 may generate trial parameter sets to include a third proportion $p_{max}$ of trial parameters sampled from the uniform distribution.

Figure 7A:
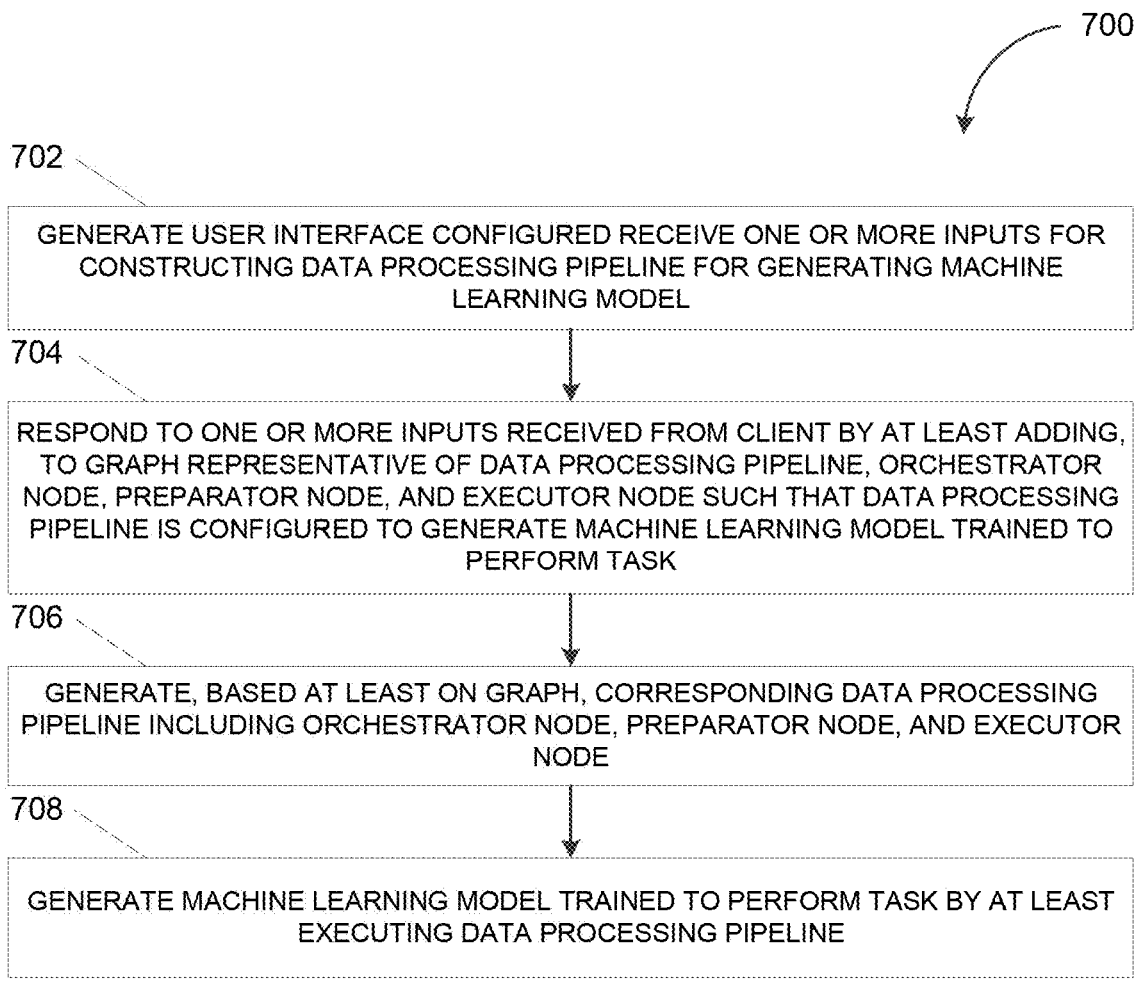
FIG. 7A depicts a flowchart illustrating a process for generating a data processing pipeline configured to generate a machine learning model, in accordance with some example embodiments.

FIG. 7A depicts a flowchart illustrating a process 700 for generating a data processing pipeline configured to generate a machine learning model, in accordance with some example embodiments. Referring to FIGS. 1, 2A-C, 3A-C, 4-5, 6A-B, and 7A-B, the process 700 may be performed by the pipeline engine 110 in order to generate, for example, the data processing pipeline 250 configured to generate a machine learning model. The machine learning model generated by the data processing pipeline may a machine learning model having a set of parameters and/or hyper-parameters for performing a cognitive task such as, for example, object identification, natural language processing, information retrieval, speech recognition, classification, and/or regression.

At 702, the pipeline engine 110 may generate a user interface configured to receive one or more inputs for constructing of a data processing pipeline for generating a machine learning model. For example, the pipeline engine 110 may generate the user interface 150 which may be configured to display, at the client 120, a selection of operator nodes including, for example, the orchestrator node 230, the preparator node 240, and the executor node 280. The selection of operator nodes displayed, at the client 120, as part of the user interface 150 may also include one or more auxiliary operator nodes including, for example, the start node 260, the user interface node 270, and/or the like. As part of a data processing pipeline, the start node 260 may be configured to receive inputs configuring a process including one or more machine learning trials while the user interface node 270 may be configured to output the progress and/or the result of the one or more machine learning trials. Alternatively, instead of displaying a selection of operator nodes, the user interface 150 may display one or more dialog boxes prompting the user 125 to select one or more operator nodes to include in a data processing pipeline.

At 704, the pipeline engine 110 may respond to one or more inputs received from the client 120 by at least adding, to a graph representative of a data processing pipeline, the orchestrator node, the preparator node, and the executor node such that the data processing pipeline is configured to generate a machine learning model trained to perform a task. For example, the pipeline engine 110 may generate a graph representative of the data processing pipeline 250 configured to generate a machine learning model. In the example shown in FIG. 2B, the data processing pipeline 250 may be constructed to include the orchestrator node 230, the preparator node 240, and the executor node 280. Furthermore, as shown in FIG. 2B, the data processing pipeline 250 may be constructed to include the start node 260 and the user interface node 270. As noted, the data processing pipeline 250 may be executed to generate a machine learning model for performing a task associated with an input dataset. As part of the data processing pipeline 250, the start node 260 may be configured to receive inputs configuring the process to generate the machine learning model while the progress and the result of the process may be output by the user interface node 270.

The orchestrator node 230, the preparator node 240, the start node 260, the user interface node 270, and the executor node 280 may be interconnected by one or more directed edges indicating a flow of data between the orchestrator node 230, the preparator node 240, the start node 260, the user interface node 270, and the executor node 280. For instance, the orchestrator node 230 and the preparator node 240 may be interconnected by a first directed edge indicating that an output of the orchestrator node 230 may be provided as an input to the preparator node 240 as well as a second directed edge indicating that an output of the preparator node 240 may be provided as an input to the orchestrator node 230. Alternatively and/or additionally, the orchestrator node 230 and the executor node 280 may be interconnected by a third directed edge indicating that an output of the orchestrator node 230 may be provided as an input to the executor node 280 as well as a fourth directed edge indicating that an output of the executor node 280 may be provided as an input to the orchestrator node 230.

At 706, the pipeline engine 110 may generate, based at least on the graph, the corresponding data processing pipeline including the orchestrator node, the preparator node, and the executor node. For instance, in some example embodiments, the pipeline engine 110 may generate, based at least on the corresponding graph, the data processing pipeline 250 including the orchestrator node 230, the preparator node 240, the start node 260, the user interface node 270, and the executor node 280

At 708, the pipeline engine 110 may generate a machine learning model trained to perform the task by at least executing the data processing pipeline. For example, the pipeline engine 110 may generate a machine learning model trained to perform a task by at least executing the data processing pipeline 250 including the orchestrator node 230, the preparator node 240, the executor node 280, the start node 260, and the user interface node 270. Executing the data processing pipeline 250 may include performing the one or more data processing operations associated with each of the orchestrator node 230, the preparator node 240, the executor node 280, the start node 260, and the user interface node 270.

In some example embodiments, the orchestrator node 230 may be executed to at least coordinate the operations of the preparator node 240 and the executor node 280. For example, the orchestrator node 230 may respond to receiving, from the start node 260, the initial configurations for implementing the machine learning model by at least triggering, at the preparator node 240, the generation of the training dataset and the validation dataset. Upon receiving, from the preparator node 240, an indication that the preparator node 240 has generated the training dataset and the validation dataset, the orchestrator node 230 may trigger, at the executor node 280, the execution of one or more machine learning trials, each of which applying a different type of machine learning model and/or a different set of trial parameters to the training dataset and/or the validation dataset generated by the preparator node 240. Moreover, the orchestrator node 230 may be executed to at least determine, based at least on the results of the machine learning trials executed by the executor node 280, a machine learning model including the set of model parameters and hyperparameters for performing a specified task.

Figure 7B:
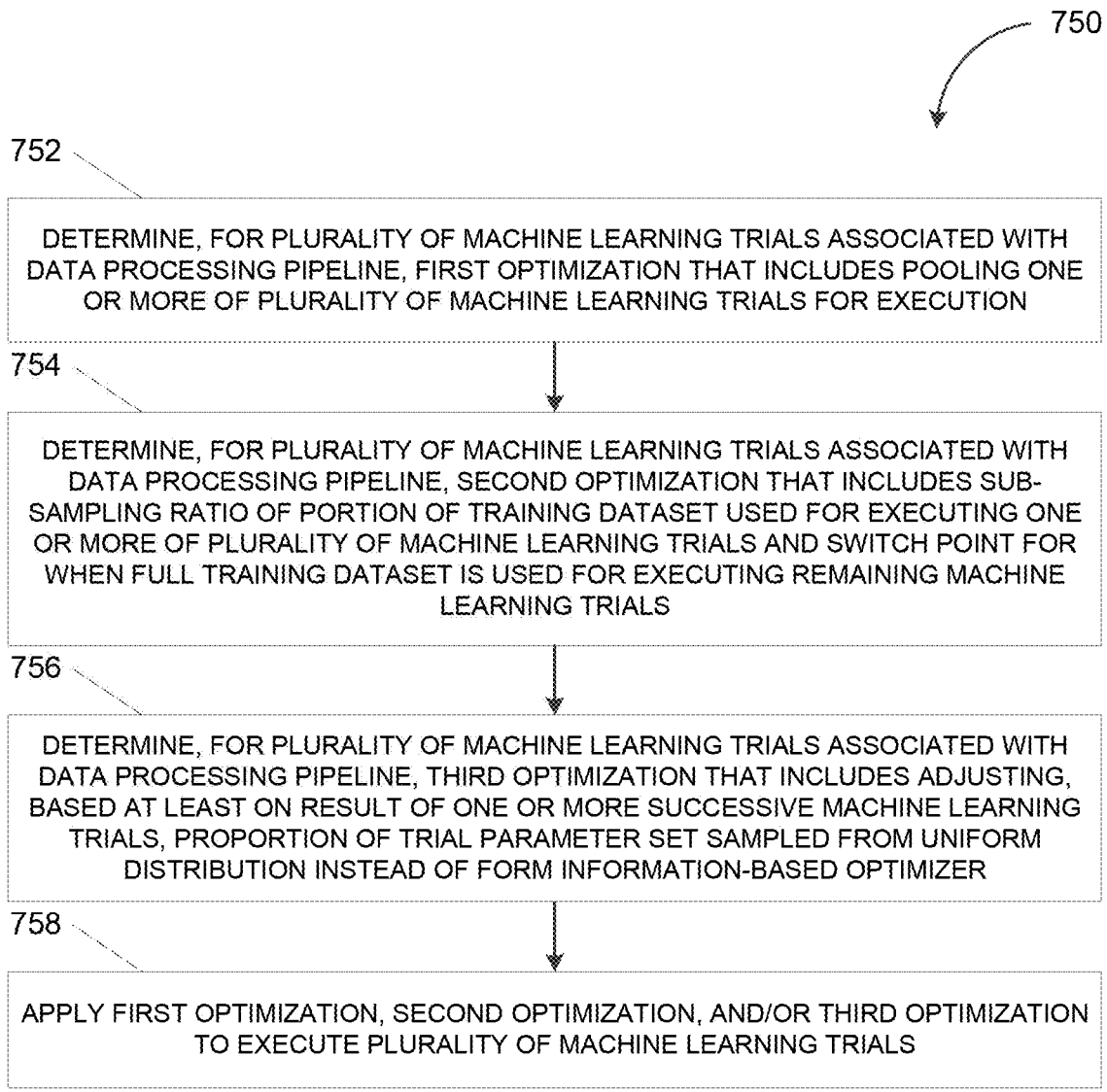
FIG. 7B depicts a flowchart illustrating an example of a process for optimizing an execution of a data processing pipeline for generating a machine learning model, in accordance with some example embodiments.

FIG. 7B depicts a flowchart illustrating an example of a process 750 for optimizing an execution of a data processing pipeline for generating a machine learning model, in accordance with some example embodiments. Referring to FIGS. 1, 2A-C, 3A-C, 4-5, 6A-B, and 7A-B, the process 750 may be performed by the orchestrator node 230 including, for example, the runtime estimator 320, as part of operation 708 of the process 700.

At 752, the orchestrator node 230 may determine, for a plurality of machine learning trials associated with a data processing pipeline, a first optimization that includes pooling one or more of the plurality of machine learning trials for execution. For example, as shown in FIG. 6B, when the overhead associated with non-computation time (e.g., including set-up time and input time) is low, as in Example 1 in FIG. 6B, each machine learning trial may be executed individually with a separate trial parameter set, with the Bayesian hyper-parameter optimizer being updated after the execution of each machine learning trial. However, when the overhead increases, it may become more efficient to pool multiple machine learning trials, for example, by sending multiple trial parameter sets to the same executor node 280 at once (as in Example 3) instead of executing each of the machine learning trials separately (as in Example 2).

Accordingly, in some example embodiments, the optimizer 330 may optimize the execution of one or more machine learning trials by at least identifying, based at least on a task metadata (e.g., statistical information on the input dataset and user configuration), an available time budget, and a list of trial parameter sets, one or more corresponding machine learning trials for pooling. For example, the optimizer 330 may determine, by at least querying the runtime estimator 320, an expected non-computation time $time_{non-computation}$ and computation time $time_{computation}$ for each machine learning trial (e.g., set of trial parameters). A pool having an $n_{trial}$ quantity of machine learning trials may be identified by adding, to the pool of machine learning trials, one or more machine learning trials until the ratio of computation time $time_{computation}$ to non-computation time $time_{non-computation}$ for the pool exceeds a threshold value (e.g., 90%) and/or the quantity of machine learning trials in the pool exceeds a threshold value (e.g., 10).

At 754, the orchestrator node 230 may determine, for the plurality of machine learning trials associated with the data processing pipeline, a second optimization that includes a sub-sampling ratio of a portion the training dataset used for executing one or more of the plurality of machine learning trials and a switch point for when the full training dataset is used for executing the remaining machine learning trials. In some example embodiments, the optimizer 330 may determine, based at least on a size, a complexity, and a runtime estimate associated with the input dataset used to generate the training dataset, whether the size of the training dataset exceeds a threshold to require sub-sampling. If the size of the training dataset exceeds the threshold, the optimizer 330 may sub-sample the training dataset such that a portion of the machine learning trials are executed based on a sub-sample of the training dataset instead of the full training dataset. Upon reaching a switch point, the remaining portion of the machine learning trials may be executed based on the full training dataset.

The optimizer 330 may determine a sub-sampling ratio by applying a bisection technique in which each successive candidate sub-sample of the training dataset includes half (or a different percentage) of one or more previous sub-samples. The optimizer 330 may continue to bisect the training dataset until reaching a sub-sampling ratio that yields a runtime that no more than a threshold portion (e.g., 50% and/or the like) of the available time budget and/or a threshold quantity of bisections. In addition to the sub-sampling ratio, the optimizer 330 may also determine a switch point by at least querying the runtime estimator 320 to determine whether the remaining time budget can accommodate the trial parameter sets if the corresponding machine learning trials are run on the full training dataset. If the sum of those runtime estimates exceeds the remaining time budget, the optimizer 330 may determine that a switch point has been reached.

At 756, the orchestrator node 230 may determine, for the plurality of machine learning trials associated with the data processing pipeline, a third optimization that includes adjusting, based at least on a result of one or more successive machine learning trials, a proportion of a trial parameter set sampled from a uniform distribution instead of from an information-based optimizer. In some example embodiments, the optimizer 330 may be configured to detect a convergence to a local optimum when performance of the machine learning trials do not improve over a threshold quantity of successive machine learning trials. In response to detecting the convergence to the local optimum, the optimizer 330 may increase the proportion of trial parameter sets retrieved via random sampling and generate a corresponding trial parameter set for a subsequent machine learning trial.

For example, as shown in Equation (2), the proportion $p_{rand}$ may correspond to the proportion of the trial parameter set sampled from the uniform random distribution. The orchestrator node 230 may generate trial parameter sets to include a first proportion $p_{min}$ of trial parameters when the quantity x of machine learning trials that have been executed without an improvement in performance does not exceed a first threshold quantity $x_{min.threshold}$. While the quantity x of machine learning trials that have been executed without an improvement in performance exceeds the first threshold quantity $x_{min.threshold}$ but does not exceed the second threshold quantity $x_{max.threshold}$, the orchestrator node 230 may generate trial parameter sets to include a second proportion of trial parameters sampled from the uniform distribution. As shown in Equation (2), this second proportion ax+b may be defined to be linearly proportional to the quantity x of machine learning trials that have been executed without an improvement in performance. When the quantity x of machine learning trials that have been executed without an improvement in performance is equal to or exceeds a third threshold quantity $x_{max.threshold}$, the orchestrator node 230 may generate trial parameter sets to include a third proportion $p_{max}$ of trial parameters sampled from the uniform distribution.

At 758, the orchestrator node 230 may apply the first optimization, the second optimization, and/or the third optimization to execute the plurality of machine learning trials. In some example embodiments, the orchestrator node 230 may apply one or more optimizations to the execution of machine learning trials including pooling of machine learning trials to reduce the overhead associated with provisioning computing instances and reading the input dataset for each individual machine learning trial, sub-sampling to accommodate large training datasets, and/or adjusting the proportion of trial parameters sampled from a uniform distribution to encourage the exploration of the full hyper-parameter space.

Figure 8:
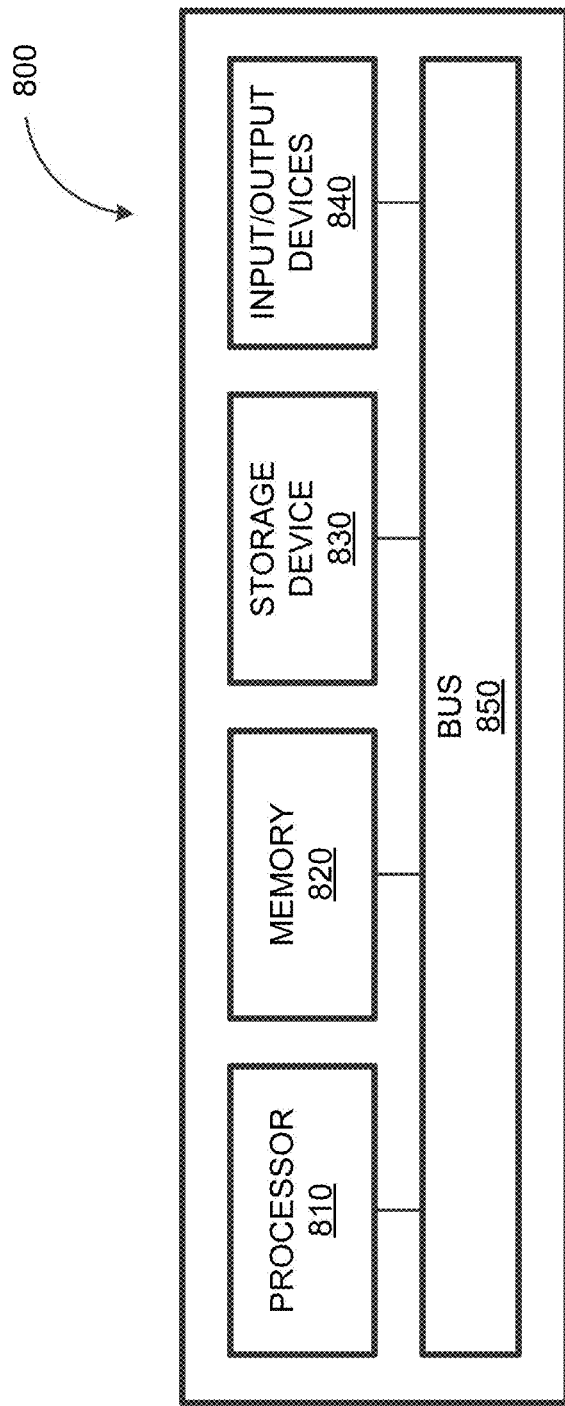
FIG. 8 depicts a block diagram illustrating a computing system, in accordance with some example embodiments.

FIG. 8 depicts a block diagram illustrating a computing system 800 consistent with implementations of the current subject matter. Referring to FIGS. 1, 2A-C, 3A-C, 4-5, 6A-B, 7A-B, and 8, the computing system 800 can be used to implement the pipeline engine 110 and/or any components therein.

As shown in FIG. 8, the computing system 800 can include a processor 810, a memory 820, a storage device 830, and input/output devices 840. The processor 810, the memory 820, the storage device 830, and the input/output devices 840 can be interconnected via a system bus 850. The processor 810 is capable of processing instructions for execution within the computing system 800. Such executed instructions can implement one or more components of, for example, the pipeline engine 110. In some example embodiments, the processor 810 can be a single-threaded processor. Alternately, the processor 810 can be a multi-threaded processor. The processor 810 is capable of processing instructions stored in the memory 820 and/or on the storage device 830 to display graphical information for a user interface provided via the input/output device 840.

The memory 820 is a computer readable medium such as volatile or non-volatile that stores information within the computing system 800. The memory 820 can store data structures representing configuration object databases, for example. The storage device 830 is capable of providing persistent storage for the computing system 800. The storage device 830 can be a solid state drive, a floppy disk device, a hard disk device, an optical disk device, or a tape device, or other suitable persistent storage means. The input/output device 840 provides input/output operations for the computing system 800. In some example embodiments, the input/output device 840 includes a keyboard and/or pointing device. In various implementations, the input/output device 840 includes a display unit for displaying graphical user interfaces.

According to some example embodiments, the input/output device 840 can provide input/output operations for a network device. For example, the input/output device 840 can include Ethernet ports or other networking ports to communicate with one or more wired and/or wireless networks (e.g., a local area network (LAN), a wide area network (WAN), the Internet).

In some example embodiments, the computing system 800 can be used to execute various interactive computer software applications that can be used for organization, analysis and/or storage of data in various formats. Alternatively, the computing system 800 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 840. The user interface can be generated and presented to a user by the computing system 800 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random query memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
   at least one data processor; and
   at least one memory storing instructions which, when executed by the at least one data processor, result in operations comprising:
   generating, based at least on one or more inputs received from a client device, a data processing pipeline configured to generate a machine learning model having a set of parameters for performing a task associated with an input dataset, the data processing pipeline comprising an orchestrator node, a preparator node, and a plurality of executor nodes, the preparator node being configured to validate, preprocess and partition at least on the input dataset, to generate a training dataset, the plurality of executor nodes being configured to execute a plurality of machine learning trials, the plurality of machine learning trials comprising a first machine learning trial that is executed by at least applying, to the training dataset, a first machine learning model having a first set of trial parameters, the plurality of machine learning trials further comprising a second machine learning trial that is executed by at least applying, to the training dataset, a second machine learning model having a second set of trial parameters, and the orchestrator node being configured to select, based at least on a result of the plurality of machine learning trials, the first machine learning model having the first set of trial parameters or the second machine learning model having the second set of trial parameters to perform the task;
   identifying one or more pools of machine learning trials, each pool of machine learning trials being assigned for execution at a single one of the plurality of executor nodes; and
   executing the data processing pipeline to generate the machine learning model for performing the task, the executing of the data processing pipeline comprises executing the one or more pools of machine learning trials.

2. The system of claim 1, further comprising:
   determining a runtime for executing the plurality of machine learning trials, the runtime comprising a non-computation time and a computation time; and
   generating, based at least on a ratio of computation time to non-computation time, the one or more pools of machine learning trials, each pool of machine learning trials being generated to have an above threshold ratio of computation time to non-computation time without comprising an above threshold quantity of machine learning trials.

3. The system of claim 1, further comprising:
   executing a portion of the plurality of machine learning trials using a sub-sample of the training dataset.

4. The system of claim 3, further comprising:
   determining, based at least on an available time budget, a sub-sampling ratio corresponding to a portion of the training dataset used for executing the portion of the plurality of machine learning trials.

5. The system of claim 4, wherein the sub-sampling ratio is determined by at least determining a first runtime associated with a first portion of the training dataset and a second runtime associated with a second portion of the training dataset, the second portion of the training dataset being a first bisection of the first portion of the training dataset, and wherein the sub-sampling ratio is determined to be a third portion of the training dataset corresponding to a second bisection between the first portion and the second portion in response to the first runtime exceeding a threshold portion of the available time budget and the second runtime not exceeding the threshold portion of the available time budget.

6. The system of claim 3, further comprising:
determining a switch point at which a full training dataset is used for executing a remaining portion of the plurality of machine learning trials.

7. The system of claim 6, wherein the switch point is determined based at least on an available time budget and a runtime associated with using the full training dataset to execute a machine learning trial, and wherein the switch point is determined to accommodate, within the available time budget, at least a single machine learning trial executed using the full training dataset.

8. The system of claim 1, further comprising:
adjusting a proportion of trial parameters sampled from a uniform distribution to avoid a convergence to a local minima within a hyper-parameter space for generating the machine learning model.

9. The system of claim 8, further comprising:
in response to a quantity of machine learning trials executed without an improvement in performance being below a first threshold, generate a trial parameter set for one or more subsequent machine learning trials to comprise a first proportion of trial parameters sampled from the uniform distribution;
in response to the quantity of machine learning trials executed without the improvement in performance being between the first threshold and a second threshold, generate the trial parameter set for one or more subsequent machine learning trials to comprise a second proportion of trial parameters sampled from the uniform distribution, the second proportion being a linear function of the quantity of machine learning trials executed without the improvement in performance; and
in response to the quantity of machine learning trials executed without the improvement in performance exceeding the second threshold, generate the trial parameter set for one or more subsequent machine learning trials to comprise a third proportion of trial parameters sampled from the uniform distribution.

10. The system of claim 1, wherein the machine learning model comprises a neural network, a regression model, an instance-based model, a regularization model, a decision tree, a random forest, a Bayesian model, a clustering model, an associative model, a dimensionality reduction model, and/or an ensemble model.

11. A computer-implemented method, comprising:
generating, based at least on one or more inputs received from a client device, a data processing pipeline configured to generate a machine learning model having a set of parameters for performing a task associated with an input dataset, the data processing pipeline comprising an orchestrator node, a preparator node, and a plurality of executor nodes, the preparator node being configured to validate, preprocess and partition at least on the input dataset, to generate a training dataset, the plurality of executor nodes being configured to execute a plurality of machine learning trials, the plurality of machine learning trials comprising a first machine learning trial that is executed by at least applying, to the training dataset, a first machine learning model having a first set of trial parameters, the plurality of machine learning trials further comprising a second machine learning trial that is executed by at least applying, to the training dataset, a second machine learning model having a second set of trial parameters, and the orchestrator node being configured to select, based at least on a result of the plurality of machine learning trials, the first machine learning model having the first set of trial parameters or the second machine learning model having the second set of trial parameters to perform the task;
identifying one or more pools of machine learning trials, each pool of machine learning trials being assigned for execution at a single one of the plurality of executor nodes; and
executing the data processing pipeline to generate the machine learning model for performing the task, the executing of the data processing pipeline comprises executing the one or more pools of machine learning trials.

12. The computer-implemented method of claim 11, further comprising:
determining a runtime for executing the plurality of machine learning trials, the runtime comprising a non-computation time and a computation time; and
generating, based at least on a ratio of computation time to non-computation time, the one or more pools of machine learning trials, each pool of machine learning trials being generated to have an above threshold ratio of computation time to non-computation time without comprising an above threshold quantity of machine learning trials.

13. The computer-implemented method of claim 11, further comprising:
executing a portion of the plurality of machine learning trials using a sub-sample of the training dataset.

14. The computer-implemented method of claim 13, further comprising:
determining, based at least on an available time budget, a sub-sampling ratio corresponding to a portion of the training dataset used for executing the portion of the plurality of machine learning trials.

15. The computer-implemented method of claim 14, wherein the sub-sampling ratio is determined by at least determining a first runtime associated with a first portion of the training dataset and a second runtime associated with a second portion of the training dataset, the second portion of the training dataset being a first bisection of the first portion of the training dataset, and wherein the sub-sampling ratio is determined to be a third portion of the training dataset corresponding to a second bisection between the first portion and the second portion in response to the first runtime exceeding a threshold portion of the available time budget and the second runtime not exceeding the threshold portion of the available time budget.

16. The computer-implemented method of claim 13, further comprising:
determining a switch point at which a full training dataset is used for executing a remaining portion of the plurality of machine learning trials.

17. The computer-implemented method of claim 16, wherein the switch point is determined based at least on an available time budget and a runtime associated with using the full training dataset to execute a machine learning trial, and wherein the switch point is determined to accommodate, within the available time budget, at least a single machine learning trial executed using the full training dataset.

18. The computer-implemented method of claim 11, further comprising:

adjusting a proportion of trial parameters sampled from a uniform distribution to avoid a convergence to a local minima within a hyper-parameter space for generating the machine learning model.

19. The computer-implemented method of claim 18, further comprising:
in response to a quantity of machine learning trials executed without an improvement in performance being below a first threshold, generate a trial parameter set for one or more subsequent machine learning trials to comprise a first proportion of trial parameters sampled from the uniform distribution;
in response to the quantity of machine learning trials executed without the improvement in performance being between the first threshold and a second threshold, generate the trial parameter set for one or more subsequent machine learning trials to comprise a second proportion of trial parameters sampled from the uniform distribution, the second proportion being a linear function of the quantity of machine learning trials executed without the improvement in performance; and
in response to the quantity of machine learning trials executed without the improvement in performance exceeding the second threshold, generate the trial parameter set for one or more subsequent machine learning trials to comprise a third proportion of trial parameters sampled from the uniform distribution.

20. A non-transitory computer readable medium storing instructions, which when executed by at least one data processor, result in operations comprising:
generating, based at least on one or more inputs received from a client device, a data processing pipeline configured to generate a machine learning model having a set of parameters for performing a task associated with an input dataset, the data processing pipeline comprising an orchestrator node, a preparator node, and a plurality of executor nodes, the preparator node being configured to validate, preprocess and partition at least on the input dataset, to generate a training dataset, the plurality of executor nodes being configured to execute a plurality of machine learning trials, the plurality of machine learning trials comprising a first machine learning trial that is executed by at least applying, to the training dataset, a first machine learning model having a first set of trial parameters, the plurality of machine learning trials further comprising a second machine learning trial that is executed by at least applying, to the training dataset, a second machine learning model having a second set of trial parameters, and the orchestrator node being configured to select, based at least on a result of the plurality of machine learning trials, the first machine learning model having the first set of trial parameters or the second machine learning model having the second set of trial parameters to perform the task;
identifying one or more pools of machine learning trials, each pool of machine learning trials being assigned for execution at a single one of the plurality of executor nodes; and executing the data processing pipeline to generate the machine learning model for performing the task, the executing of the data processing pipeline comprises executing the one or more pools of machine learning trials.

* * * * *